United States Patent
Li et al.

(10) Patent No.: US 11,522,650 B2
(45) Date of Patent: *Dec. 6, 2022

(54) METHODS AND APPARATUS FOR MULTI-CARRIER COMMUNICATION SYSTEMS WITH ADAPTIVE TRANSMISSION AND FEEDBACK

(71) Applicant: Neo Wireless LLC, Wayne, PA (US)

(72) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: Neo Wireless LLC, Wayne, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/727,322

(22) Filed: Apr. 22, 2022

(65) Prior Publication Data

US 2022/0248390 A1 Aug. 4, 2022

Related U.S. Application Data

(63) Continuation of application No. 17/341,871, filed on Jun. 8, 2021, which is a continuation of application
(Continued)

(51) Int. Cl.
*H04W 4/00* (2018.01)
*H04L 5/00* (2006.01)
(Continued)

(52) U.S. Cl.
CPC ......... *H04L 5/0044* (2013.01); *H04B 7/0413* (2013.01); *H04L 1/0026* (2013.01);
(Continued)

(58) Field of Classification Search
CPC . H04W 72/046; H04W 72/044; H04W 52/26; H04B 7/0413; H04L 1/0026;
(Continued)

(56) References Cited

U.S. PATENT DOCUMENTS 5,825,807 A 10/1998 Kumar
5,828,695 A 10/1998 Webb
(Continued)

FOREIGN PATENT DOCUMENTS

KR 20010083789 9/2001
KR 20030085074 11/2003
(Continued)

OTHER PUBLICATIONS

Teng et al. ( Proposal of Grouping Adaptive Modulation Method for Burst Mode OFDM Transmission System, Jan. 2003) (Year: 2003).*
(Continued)

*Primary Examiner* — Maharishi V Khirodhar
(74) *Attorney, Agent, or Firm* — Volpe Koenig

(57) ABSTRACT

An arrangement is disclosed where in a multi-carrier communication system, the modulation scheme, coding attributes, training pilots, and signal power may be adjusted to adapt to channel conditions in order to maximize the overall system capacity and spectral efficiency without wasting radio resources or compromising error probability performance, etc.

244 Claims, 8 Drawing Sheets

Related U.S. Application Data

No. 17/094,286, filed on Nov. 10, 2020, now Pat. No. 11,032,801, which is a continuation of application No. 16/126,896, filed on Sep. 10, 2018, now Pat. No. 10,834,706, which is a continuation of application No. 15/082,878, filed on Mar. 28, 2016, now Pat. No. 10,075,941, which is a continuation of application No. 14/539,917, filed on Nov. 12, 2014, now Pat. No. 9,301,296, which is a continuation of application No. 13/246,677, filed on Sep. 27, 2011, now abandoned, which is a continuation of application No. 12/755,313, filed on Apr. 6, 2010, now Pat. No. 8,027,367, which is a continuation of application No. 10/583,529, filed as application No. PCT/US2005/004601 on Feb. 14, 2005, now Pat. No. 7,693,032.

(60) Provisional application No. 60/544,521, filed on Feb. 13, 2004.

(51) Int. Cl.
*H04L 1/00* (2006.01)
*H04B 7/0413* (2017.01)
*H04W 72/04* (2009.01)
*H04W 52/26* (2009.01)

(52) U.S. Cl.
CPC .......... *H04L 1/0029* (2013.01); *H04L 1/0068* (2013.01); *H04L 1/0073* (2013.01); *H04L 5/006* (2013.01); *H04L 5/0007* (2013.01); *H04L 5/0046* (2013.01); *H04L 5/0048* (2013.01); *H04W 72/044* (2013.01); *H04W 72/0406* (2013.01); *H04L 1/0003* (2013.01); *H04L 1/0009* (2013.01); *H04L 5/0091* (2013.01); *H04W 52/26* (2013.01)

(58) Field of Classification Search
CPC ... H04L 5/0007; H04L 5/0048; H04L 1/0029; H04L 1/0068; H04L 1/0073; H04L 5/0044; H04L 5/0046; H04L 5/006; H04L 27/2608; H04L 1/0003; H04L 5/0091
See application file for complete search history.

(56) References Cited

U.S. PATENT DOCUMENTS

| | | |
|---|---|---|
| 5,867,478 A | 2/1999 | Baum et al. |
| 5,898,338 A | 4/1999 | Proctor et al. |
| 5,929,704 A | 7/1999 | Proctor, Jr. et al. |
| 6,014,550 A | 1/2000 | Rikkinen |
| 6,078,216 A | 6/2000 | Proctor, Jr. |
| 6,400,699 B1 | 6/2002 | Airy et al. |
| 6,400,783 B1 | 6/2002 | Cusani |
| 6,480,558 B1 | 11/2002 | Ottosson et al. |
| 6,515,960 B1 | 2/2003 | Usui et al. |
| 6,567,383 B1 | 5/2003 | Bohnke |
| 6,643,281 B1 | 11/2003 | Ryan |
| 6,654,429 B1 | 11/2003 | Li |
| 6,731,673 B1 | 5/2004 | Kotov et al. |
| 6,741,578 B1 | 5/2004 | Moon et al. |
| 6,791,960 B1 | 9/2004 | Song |
| 6,847,678 B2 | 1/2005 | Berezdivin et al. |
| 6,904,550 B2 | 6/2005 | Sibecas et al. |
| 6,909,761 B2 | 6/2005 | Kloos et al. |
| 6,922,388 B1 | 7/2005 | Laroia et al. |
| 6,937,592 B1 | 8/2005 | Heath, Jr. et al. |
| 6,937,642 B2 | 8/2005 | Hirata |
| 6,940,827 B2 | 9/2005 | Li et al. |
| 6,947,748 B2 | 9/2005 | Li et al. |
| 6,973,502 B2 | 12/2005 | Patil |
| 7,020,072 B1 | 3/2006 | Li et al. |
| 7,035,663 B1 | 4/2006 | Linebarger et al. |
| 7,039,001 B2 | 5/2006 | Krishnan et al. |
| 7,039,003 B2 | 5/2006 | Hayashi et al. |
| 7,062,002 B1 | 6/2006 | Michel et al. |
| 7,103,325 B1 | 9/2006 | Jia et al. |
| 7,110,783 B2 | 9/2006 | Bahl et al. |
| 7,123,934 B1 | 10/2006 | Linebarger et al. |
| 7,161,985 B2 | 1/2007 | Dostert et al. |
| 7,173,991 B2 | 2/2007 | Scarpa |
| 7,209,459 B2 | 4/2007 | Kangas |
| 7,248,559 B2 | 7/2007 | Ma et al. |
| 7,257,423 B2 | 8/2007 | Iochi |
| 7,260,054 B2 | 8/2007 | Olszewski |
| 7,289,494 B2 | 10/2007 | Lakkis |
| 7,304,939 B2 | 12/2007 | Steer et al. |
| 7,317,702 B2 | 1/2008 | Dominique et al. |
| 7,333,457 B2 | 2/2008 | Gopalakrishnan et al. |
| 7,376,193 B2 | 5/2008 | Lee et al. |
| 7,386,055 B2 | 6/2008 | Morita et al. |
| 7,388,847 B2 | 6/2008 | Dubuc et al. |
| 7,403,513 B2 | 7/2008 | Lee et al. |
| 7,403,556 B2 | 7/2008 | Kao et al. |
| 7,418,042 B2 | 8/2008 | Choi et al. |
| 7,436,757 B1 | 10/2008 | Wilson et al. |
| 7,437,166 B2 | 10/2008 | Osseiran et al. |
| 7,443,829 B2 | 10/2008 | Rizvi et al. |
| 7,492,722 B2 | 2/2009 | Pietraski et al. |
| 7,555,268 B2 | 6/2009 | Trachewsky et al. |
| 7,567,624 B1 | 7/2009 | Schmidl et al. |
| 7,577,100 B2 | 8/2009 | Pollmann et al. |
| 7,619,963 B2 | 11/2009 | Abe et al. |
| 7,630,339 B2 | 12/2009 | Laroia et al. |
| 7,630,356 B2 | 12/2009 | Zhang et al. |
| 7,646,747 B2 | 1/2010 | Atarashi et al. |
| 7,680,094 B2 | 3/2010 | Liu |
| 7,693,032 B2 | 4/2010 | Li et al. |
| 7,693,125 B2 | 4/2010 | Ihm et al. |
| 7,697,466 B2 | 4/2010 | Hashimoto et al. |
| 7,702,027 B2 | 4/2010 | Shirakata et al. |
| 7,724,720 B2 | 5/2010 | Korpela et al. |
| 7,738,437 B2 | 6/2010 | Ma et al. |
| 7,864,725 B2 | 1/2011 | Li et al. |
| 7,864,739 B2 | 1/2011 | Atarashi et al. |
| 7,904,093 B2 | 3/2011 | Nystrom et al. |
| 7,907,592 B2 | 3/2011 | Han et al. |
| 7,912,490 B2 | 3/2011 | Pietraski |
| 8,009,660 B2 | 8/2011 | Li et al. |
| 8,018,902 B2 | 9/2011 | Wintzell |
| 8,027,367 B2 | 9/2011 | Li et al. |
| 8,094,611 B2 | 1/2012 | Li et al. |
| 8,179,833 B2 | 5/2012 | Attar et al. |
| 8,306,138 B2 | 11/2012 | Imamura et al. |
| 8,428,009 B2 | 4/2013 | Li et al. |
| 8,724,555 B2 | 5/2014 | Krishnan et al. |
| 9,301,296 B2 | 3/2016 | Li et al. |
| 9,473,269 B2 | 10/2016 | Walton et al. |
| 10,638,468 B2 | 4/2020 | Nelson et al. |
| 2002/0032030 A1 | 3/2002 | Berglund et al. |
| 2002/0093922 A1 | 7/2002 | Grilli et al. |
| 2002/0147017 A1 | 10/2002 | Li et al. |
| 2002/0159422 A1 | 10/2002 | Li et al. |
| 2002/0159430 A1 | 10/2002 | Atarashi et al. |
| 2003/0081538 A1 | 5/2003 | Walton et al. |
| 2003/0103445 A1 | 6/2003 | Steer et al. |
| 2003/0108013 A1 | 6/2003 | Hwang et al. |
| 2003/0125040 A1 | 7/2003 | Walton et al. |
| 2003/0214927 A1 | 11/2003 | Atarashi et al. |
| 2004/0022176 A1 | 2/2004 | Hashimoto et al. |
| 2004/0047284 A1 | 3/2004 | Eidson |
| 2004/0128605 A1 | 7/2004 | Sibecas et al. |
| 2004/0142698 A1 | 7/2004 | Pietraski |
| 2004/0165683 A1 | 8/2004 | Gupta et al. |
| 2005/0002369 A1 | 1/2005 | Ro et al. |
| 2005/0003782 A1 | 1/2005 | Wintzell |
| 2005/0025039 A1* | 2/2005 | Hwang ............... H04L 5/0044 370/206 |
| 2005/0111397 A1 | 5/2005 | Attar et al. |
| 2005/0201326 A1 | 9/2005 | Lakkis |
| 2005/0226182 A1 | 10/2005 | Itoh |
| 2005/0239467 A1 | 10/2005 | Nishio |

(56) References Cited

U.S. PATENT DOCUMENTS

| | | | |
|---|---|---|---|
| 2007/0026803 | A1 | 2/2007 | Malm |
| 2007/0053282 | A1 | 3/2007 | Tong et al. |
| 2007/0263735 | A1 | 11/2007 | Tong et al. |
| 2008/0165710 | A1 | 7/2008 | Parts et al. |
| 2011/0299474 | A1 | 12/2011 | Li et al. |

FOREIGN PATENT DOCUMENTS

| | | |
|---|---|---|
| KR | 20040055517 | 6/2004 |
| KR | 20060007481 | 1/2006 |
| WO | 2002/093819 | 11/2002 |

OTHER PUBLICATIONS

Sinem et al. (Channel estimation Techniques Based on Pilot Arrangement in OFDM, 2002) (Year: 2002).*
$3^{rd}$ Generation Partnership Project 2 "3GPP2", "cdma2000 High Rate Packet Data Air Interface Specification," 3GPP2 C.S0024, Version 4.0 (Oct. 25, 2002).
$3^{rd}$ Generation Partnership Project 2 "3GPP2", "cdma2000 High Rate Packet Data Air Interface Specification," 3GPP2 C.S0024, Version 3.0 (Dec. 5, 2001).
$3^{rd}$ Generation Partnership Project 2 "3GPP2", "cdma2000 High Rate Packet Data Air Interface Specification," 3GPP2 C.S0024, Version 2.0 (Oct. 27, 2000).
$3^{rd}$ Generation Partnership Project 2 "3GPP2", "cdma2000 High Rate Packet Data Air Interface Specification," 3GPP2 C.S0024-A, Version 1.0 (Mar. 2004).
802.16.2-2004—IEEE Recommended Practice for Local and Metropolitan Area Networks Coexistence of Fixed Broadband Wireless Access Systems (Mar. 17, 2004).
802.16a-2003—IEEE Standard for Amendment to IEEE Standard for Local and Metropolitan Area Networks—Part 16: Air Interface for Fixed Broadband Wireless Access Systems—Medium Access Control Modifications and Additional Physical Layer Specifications for 2-11 GHz (Apr. 1, 2003).
Baxley et al., "Power Savings Analysis of Peak-to-Average Power Ratio Reduction in OFDM," IEEE Transactions on Consumer Electronics, vol. 50, No. 3 (Aug. 2004).
Cable Television Laboratories, Inc., "Data-Over-Cable Service Interface Specifications, DOCSIS 2.0, Radio Frequency Interface Specification," SP-RFIv2.0-I04-030730 (Jul. 30, 2003).
Cable Television Laboratories, Inc., "Data-Over-Cable Service Interface Specifications, DOCSIS 2.0, Radio Frequency Interface Specification," CM-SP-RFIv2.0-I07-041210 (Dec. 2004).
Coleri et al., "Channel Estimation Techniques Based on Pilot Arrangement in OFDM," IEEE Transactions on Broadcasting, vol. 48, No. 3 (Sep. 2002).
*Dell Inc. et al.*, v. *Neo Wireless LLC*, Decision Denying Institution of Inter Partes Review of U.S. Pat. No. 10,075,941, IPR 2021-01468 (Mar. 14, 2022).
*Dell Inc. et al.*, v. *Neo Wireless LLC*, Declaration of Dr. Ding, Inter Partes Review of U.S. Pat. No. 10,075,941 (Aug. 24, 2021).
*Dell Inc. et al.*, v. *Neo Wireless LLC*, Petition for Inter Partes Review of U.S. Pat. No. 10,075,941 pursuant to 35 U.S.C. §§ 311-319, 37 C.F.R. § 42 (Sep. 1, 2021).
ETSI TR 101 154 V1.4.1, Digital Video Broadcasting (DVB); Implementation guidelines for the use of MPEG-2 Systems, Video and Audio in satellite, cable and terrestrial broadcasting applications (Jul. 2000).
ETSI TS 101 154 V1.5.1, Digital Video Broadcasting (DVB); Implementation guidelines for the use of Video and Audio Coding in Broadcasting Applications based on the MPEG-2 Transport Stream (May 2004).
Garcia et al., "Efficient Pilot Patterns for Channel Estimation in OFDM Systems Over HF Channels," IEEE VTS 50th Vehicular Technology Conference, Gateway to 21st Century Communications Village, pp. 2193-2197 (1999).
Guo et al., "Reducing Peak-to-Average Power Ratio in OFDM Systems by Adaptive Dynamic Range Companding," 2002 World Wireless Congress, San Francisco, CA (2002).
IEEE 802.11g-2003—IEEE Standard for Information technology—Local and metropolitan area networks—Specific requirements—Part 11: Wireless LAN Medium Access Control (MAC) and Physical Layer (PHY) Specifications: Further Higher Data Rate Extension in the 2.4 GHz Band (Jun. 27, 2003).
International Search Report and Written Opinion, PCT Application No. PCT/US05/03518; Filed Jan. 27, 2005; Applicant: Waitical Solutions Inc.• dated May 23, 2005• 8 pages.
International Search Report and Written Opinion; PCT Application No. PCT/US05/04601: Filed Feb. 14, 2005; Applicant: Waitical Solutions Inc: dated Jun. 7, 2005; 9 pages.
International Search Report and Written Opinion; PCT Application No. PCT/US05/01939; Filed Jan. 20, 2005; Applicant: Waitical Solutions Inc.• dated Apr. 26, 2005: 7 pages.
Koffman et al., "Broadband Wireless Access Solutions Based on OFDM Access in IEEE 802.16," IEEE Communications Magazine, pp. 96-103 (Apr. 2002).
Matsumoto et al., "OFDM subchannel space-combining transmission diversity for broadband wireless communication systems," ICUPC '98. IEEE 1998 International Conference on Universal Personal Communications. Conference Proceedings (Cat. No.98TH8384), Florence, Italy, pp. 137-141 vol. 1 (1998).
*Neo Wireless LLC* v. *American Honda Motor Co., Inc et al.*, Plaintiff Neo Wireless LLC's Complaint for Patent Infringement, United States District Court for the Southern District of Ohio Eastern Division at Columbus, Case No. 2:22-cv-01824-EAS-KAJ (Mar. 29, 2022).
*Neo Wireless LLC* v. *Apple Inc.*, Apple Inc's Answer to Plaintiff's First Amended Complaint, Civil Action No. 6:21-cv-00026-ADA (Jun. 17, 2021).
*Neo Wireless LLC* v. *Apple Inc.*, Plaintiff's First Amended Complaint, Civil Action No. 6:21-cv-0026 (Apr. 28, 2021).
*Neo Wireless LLC* v. *Dell Technologies Inc. et al.*, Declaration of Roger Fulgham in Support of Defendants' Opening Claim Construction, Civil Action No. 6:21-cv-0024 (Oct. 28, 2021).
*Neo Wireless LLC* v. *Dell Technologies Inc. et al.*, Declaration of James Proctor in Support of Defendants' Opening Claim Construction Brief, Civil Action No. 6:21-cv-0024 (Oct. 27, 2021).
*Neo Wireless LLC* v. *Dell Technologies Inc. et al.*, Declaration of William Alberth in Support of Neo Wireless's Responsive Claim Construction Brief, Civil Action No. 6:21-cv-0024 (Nov. 18, 2021).
*Neo Wireless LLC* v. *Dell Technologies Inc. et al.*, Defendant's Answer, Affirmative Defenses, and Counterclaims to Plaintiff's First Amended Complaint, Civil Action No. 6:21-cv-0024 (Jun. 18, 2021).
*Neo Wireless LLC* v. *Dell Technologies Inc. et al.*, Defendants' Opening Claim Construction Brief, Civil Action No. 6:21-cv-0024 (Oct. 28, 2021).
*Neo Wireless LLC* v. *Dell Technologies Inc. et al.*, Defendants' Reply Claim Construction Brief, Civil Action No. 6:21-cv-0024 (Dec. 2, 2021).
*Neo Wireless LLC* v. *Dell Technologies Inc. et al.*, Joint Claim Construction Statement, Civil Action No. 6:21-cv-0024 (Dec. 21, 2021).
*Neo Wireless LLC* v. *Dell Technologies Inc. et al.*, Neo Wireless's Answer to Dell's Counterclaims, Civil Action No. 6:21-cv-0024 (Jul. 9, 2021).
*Neo Wireless LLC* v. *Dell Technologies Inc. et al.*, Plaintiff Neo Wireless LLC's Claim Construction Sur Reply Brief, Civil Action No. 6:21-cv-0024 (Dec. 16, 2021).
*Neo Wireless LLC* v. *Dell Technologies Inc. et al.*, Plaintiff Neo Wireless LLC's Responsive Claim Construction Brief, Civil Action No. 6:21-cv-0024 (Nov. 18, 2021).
*Neo Wireless LLC* v. *Dell Technologies Inc. et al.*, Plaintiff Neo Wireless LLC's Response to Defendants' Supplemental Claim Construction Brief, C.A. No. 1:22-cv-60-DAE (Jun. 8, 2022).
*Neo Wireless LLC* v. *Dell Technologies Inc. et al.*, Stipulated Constructions, Civil Action No. 6:21-cv-0024 (Oct. 27, 2021).

(56) References Cited

OTHER PUBLICATIONS

*Neo Wireless LLC* v. *Dell Technologies Inc. et al.*, Supplemental Declaration of James Proctor in Support of Defendants' Reply Claim Construction Brief, Civil Action No. 6:21-cv-0024 (Dec. 2, 2021).
*Neo Wireless LLC* v. *Dell Technologies Inc. et al.*, Plaintiff's First Amended Complaint, Civil Action No. 6:21-cv-0024 (Apr. 28, 2021).
*Neo Wireless LLC* v. *Ford Motor Company*, Plaintiff Neo Wireless LLC's Complaint for Patent Infringement, United States District Court for the Western District of Missouri Western Division, Case No. 4:22-cv-00210-GAF (Mar. 29, 2022).
*Neo Wireless LLC* v. *General Motors Company et al.*, Plaintiff Neo Wireless LLC's Complaint for Patent Infringement, United States District Court for the Eastern District of Texas Marshall Division, Case No. 2:22-cv-00094 (Mar. 29, 2022).
*Neo Wireless LLC* v. *LG Electroncs Inc.*, Defendant LG's Answer to Plaintiff's First Amended Complaint, Civil Action No. 6:21-cv-00025-ADA (Jun. 17, 2021).
*Neo Wireless LLC* v. *LG Electronics, Inc. et al.*, Plaintiff's First Amended Complaint, Civil Action No. 6:21-cv-0025 (Apr. 28, 2021).
*Neo Wireless LLC* v. *Nissan North America Inc. et al.*, Plaintiff Neo Wireless LLC's Complaint for Patent Infringement, United States District Court for the Middle District of Tennessee Nashville Division, Case No. 3:22-cv-00220 (Mar. 29, 2022).
*Neo Wireless LLC* v. *Tesla Inc.*, Plaintiff Neo Wireless LLC's Complaint for Patent Infringement, United States District Court for the Eastern District of Texas Marshall Division, Case No. 2:22-cv-00095 (Mar. 29, 2022).
*Neo Wireless LLC* v. *Toyota Motor North America, Inc. et al.*, Plaintiff Neo Wireless LLC's Complaint for Patent Infringement, United States District Court for the Eastern District of Texas Marshall Division, Case No. 2:22-cv-00093 (Mar. 29, 2022).
*Neo Wireless LLC* v. *Volkswagen Group of America, Inc., et al.*, Plaintiff NEO Wireless LLC's Complaint for Patent Infringement, United States District Court for the Eastern District of Tennessee Chattanooga District, Case No. 1:22-cv-00076 (Mar. 29, 2022).
Neo Wireless LLC, Claim Chart—Claim 13 of U.S. Pat. No. 10,075,941, submitted with Plaintiff's First Amended Complaint, *Neo Wireless LLC* v. *Dell, Inc. et al.*, Civil Action No. 6:21-cv-0024 (Apr. 28, 2021).
*Neo Wireless, LLC* v. *Dell Technologies Inc. et al.*, Defendants' Supplemental Claim Construction Brief, Civil Action No. 1:22-cv-00060-DAE (May 18, 2022).
Panta et al., "Use of Peak-to-Average Power Reduction Technique in HIPERLAN2 and its Performance in a Fading Channel." Proc. 6th International Symposium on DSP for Communication Systems, pp. 113-117, (2002).
Prasad, "Chapter 6—The Peak Power Problem," in OFDM for Wireless Communications Systems, Artech House (2004).
Qiu et al., "Constant rate adaptive modulation with selection transmit diversity for broadband OFDM systems," 14th IEEE Proceedings on Personal, Indoor and Mobile Radio Communications, 2003. PIMRC 2003., Beijing, China, pp. 722-726 vol. 1, (2003).
Shi et al., "An adaptive antenna selection scheme for transmit diversity in OFDM systems," IEEE 54th Vehicular Technology Conference. VTC Fall 2001. Proceedings (Cat. No. 01CH37211), Atlantic City, NJ, USA, pp. 2168-2172 vol.4, (2001).
Simeone, et al., "Adaptive pilot pattern for OFDM systems," IEEE Communications Society© 2004 IEEE, 5 paqes.
Teng et al., "Proposal of Grouping Adaptive Modulation Method for Burst-Mode OFDM Transmission System," IEICE Trans. Commun., vol. E86-B, No. 1 (Jan. 2003).
Van Nee et al., OFDM for Wireless Multimedia Communications, Artech House (2000).
You et al., "A Simple Construction of OFDM-CDMA Signals with Low Peak-to-Average Power Ratio," IEEE Transactions on Broadcasting, vol. 49, No. 4 (Dec. 2003).

*Neo Wireless LLC* v. *Dell Inc., et al.*, U.S. District Court, Western District of Texas, Case 6:21-cv-0024.
*Neo Wireless LLC* v. *LG Electronics Inc., et al.*, U.S. District Court, Western District of Texas, Case 6:21-cv-0025.
*Neo Wireless LLC* v. *Apple Inc.*, U.S. District Court, Western District of Texas, Case 6:21-cv-0026.
*Neo Wireless LLC* v. *Ford Motor Company*, U.S. District Court, Western District of Missouri, Case 4:22-cv-00210-GAF.
*Neo Wireless LLC* v. *General Motors Company, et al.*, U.S. District Court, Eastern District of Texas, Case 2:22-cv-00094.
*Neo Wireless LLC* v. *American Honda Motor Co., Inc. et al.*, U.S. District Court, Southern District of Ohio, Case 2:22-cv-01824-EAS-KAJ.
*Neo Wireless LLC* v. *Nissan North America Inc. et al.*, U.S. District Court, Middle District of Tennessee, Case 3:22-cv-11405-TGB.
*Neo Wireless LLC* v. *Tesla Inc.*, U.S. District Court, Eastern District of Texas, Case 2:22-cv-00095.
*Neo Wireless LLC* v. *Volkswagen Group of America, Inc. et al.*, U.S. District Court, Eastern District of Tennessee, Case 2:22-cv-11404-TGB.
*Neo Wireless LLC* v. *Toyota Motor North America, Inc. et al.*, U.S. District Court, Eastern District of Texas, Case 2:22-cv-00093.
*Neo Wireless, LLC* v. *FCA US, LLC*, U.S. District Court, Northern District of Ohio, Case 3:22-cv-01252.
*Neo Wireless LLC* v. *Mercedes-Benz USA, LLC*, U.S. District Court, Middle District of Florida, Case 3:22-cv-00780.
*Neo Wireless, LLC* v. *American Honda Motor Co., Inc. et al.* and *Neo Wireless LLC* v. *Nissan North America Inc. et al.*, Plaintiff Neo Wireless, LLC's Response to Defendants Honda and Nissan's Motion to Dismiss Plaintiff's Claims of Willful and Induced Patent Infringement, 2:22-CV-03034-TGB (Sep. 1, 2022).
*Neo Wireless, LLC* v. *American Honda Motor Co., Inc. et al.* and *Neo Wireless, LLC* v. *Nissan North America Inc. et al.*, Plaintiff Neo Wireless, LLC's Response to Defendants Honda and Nissan's Motion to Dismiss Plaintiff's Claims of Willful and Induced Patent Infringement, 2:22-CV-11403-TGB (Aug. 31, 2022).
*Neo Wireless, LLC* v. *Ford Motor Company*, Ford Motor Company's Answer to First Amended Complaint for Patent Infringement, Affirmative Defenses, and Counterclaims, Case No. 2:22-cv-11402-TGB (Aug. 24, 2022).
*Neo Wireless, LLC* v. *General Motors Company et al.*, The General Motors Defendants Answer to First Amended Complaint, 2:22-CV-11407-TGB (Aug. 24, 2022).
*Neo Wireless, LLC* v. *Tesla, Inc.*, Tesla's Answer to Amended Complaint, 2:22-CV-11408-TGB (Aug. 24, 2022).
*Neo Wireless, LLC* v. *Toyota Motor Corporation et al.*, Defendants' Answer and Affirmative Defenses to Plaintiff's First Amended Complaint for Patent Infringement, No. 2:22-CV-11406-TGB (Aug. 24, 2022).
*Neo Wireless, LLC* v. *Volkswagen Group of America, Inc. et al.*, Plaintiff Neo Wireless, LLC's Response to Volkswagen Defendants' Motion to Dismiss Pursuant to Federal Rule of Civil Procedure 12(b)(6), 2:22-CV-11404-TGB (Aug. 31, 2022).
*Neo Wireless LLC* v. *Nissan North America Inc. et al.*, U.S. District Court, Middle District of Tennessee, Case 3:22-cv-00220.
*Neo Wireless LLC* v. *Volkswagen Group of America, Inc. et al.*, US. District Court, Eastern District of Texas, Case 2:22-cv-00093
*Neo Wireless LLC* v. *Nissan North America Inc. et al.*, U.S. District Court, Eastern District of Tennessee, Case 1:22-cv-00076.
ANSI/IEEE Std 802.11, 1999 Edition (R2003), Information technology—Telecommunications and information exchange between systems—Local and metropolitan area networks—Specific requirements—Part 11: Wireless LAN Medium Access Control (MAC) and Physical Layer (PHY) Specifications (Reaffirmed Jun. 12, 2003).
*Neo Wireless LLC* v. *American Honda Motor Co., Inc. et al.*, and *Neo Wireless LLC* v. *Nissan North America Inc. et al.*, Defendants Honda and Nissan's Motion to Dismiss Plaintiff's Claims of Willful and Induced Patent Infringement, Civil Action Nos. 2:22-cv-11403-TGB and Civil Action Nos. 2:22-cv-11405-TGB (Aug. 10, 2022).
*Neo Wireless LLC* v. *American Honda Motor Co., Inc. et al.*, Defendants' Motion to Dismiss Plaintiff's Complaint, Civil Action No. 2:22-cv-01824-EAS-KAJ (Jun. 21, 2022).

(56) References Cited

OTHER PUBLICATIONS

*Neo Wireless LLC* v. *American Honda Motor Co., Inc. et al.,* Plaintiff Neo Wireless, LLC's First Amended Complaint for Patent Infringement, Civil Action No. 2:22-cv-11403-TGB (Jul. 20, 2022).
*Neo Wireless LLC* v. *FCA US, LLC,* Plaintiff Neo Wireless LLC's Complaint for Patent Infringement, Civil Action No. 3:22-cv-01252 (Jul. 15, 2022).
*Neo Wireless LLC* v. *Ford Motor Company,* Ford Motor Company's Motion to Dismiss, Civil Action No. 4:22-va-00210-GAF (Jun. 21, 2022).
*Neo Wireless LLC* v. *Ford Motor Company,* Plaintiff Neo Wireless, LLC's First Amended Complaint for Patent Infringement, Civil Action No. 2:22-cv-11402-TGB (Jul. 20, 2022).
*Neo Wireless LLC* v. *General Motors Company et al.,* Defendants General Motor Company and General Motors LLC's Answer to Complaint, Civil Action No. 2:22-cv-0094-JRG-RSP (Jun. 21, 2022).
*Neo Wireless LLC* v. *General Motors Company et al.,* Plaintiff Neo Wireless, LLC's First Amended Complaint for Patent Infringement, Civil Action No. 2:22-cv-11407-TGB (Jul. 20, 2022).
*Neo Wireless LLC* v. *Mercedes-Benz USA, LLC,* Plaintiff Neo Wireless LLC's Complaint for Patent Infringement, Civil Action No. 3:22-cv-00780 (Jul. 15, 2022).
*Neo Wireless LLC* v. *Nissan North America Inc. et al.,* Defendants' Motion to Dismiss the Complaint Pursuant to Rule 12(b)(6), Civil Action No. 3:22-cv-00220 (Jun. 21, 2022).
*Neo Wireless LLC* v. *Nissan North America Inc. et al.,* Plaintiff Neo Wireless, LLC's First Amended Complaint for Patent Infringement, Civil Action No. 2:22-cv-11405-TGB (Jul. 20, 2022).
*Neo Wireless LLC* v. *Tesla Inc.,* Defendant Tesla, Inc.'s Answer to Complaint, Civil Action No. 2'22-cv-0095-JRG-RSP (Jun. 21, 2022).
*Neo Wireless LLC* v. *Tesla Inc.,* Plaintiff Neo Wireless, LLC's First Amended Complaint for Patent Infringement, Civil Action No. 2:22-cv-11408-TGB (Jul. 20, 2022).
*Neo Wireless LLC* v. *Toyota Motor Corporation et al.,* Plaintiff Neo Wireless, LLC's First Amended Complaint for Patent Infringement, Civil Action No. 2:22-cv-00093-JRG-RSP (Jun. 24, 2022).
*Neo Wireless LLC* v. *Volkswagen Group of America, Inc. et al.,* Defendants Volkswagen Group of America, Inc. and Volkswagen Group of America Chattanooga Operations, LLC's Motion to Dismiss Pursuant to Federal Rule of Civil Procedure 12(b)(6), Civil Action No. 2:22-cv-11404-TGB (Aug. 10, 2022).
*Neo Wireless LLC* v. *Volkswagen Group of America, Inc. et al.,* Plaintiff Neo Wireless, LLC's First Amended Complaint for Patent Infringement, Civil Action No. 2:22-cv-11404-TGB (Jul. 20, 2022).
Neo Wireless LLC, Claim Chart—Claim 13 of U.S. Pat. No. 10,075,941, submitted with Plaintiff's First Amended Complaint, *Neo Wireless LLC* v. *American Honda Motor Co., Inc. et al.,* Civil Action No. 2:22-cv-11403-TGB (Jul. 20, 2022).
Neo Wireless LLC, Claim Chart—Claim 13 of U.S. Pat. No. 10,075,941, submitted with Plaintiff's First Amended Complaint, *Neo Wireless LLC* v. *Volkswagen., Inc. et al.,* Civil Action No. 2:22-cv-11404-TGB (Jul. 20, 2022).
Neo Wireless LLC, Claim Chart—Claim 13 of U.S. Pat. No. 10,075,941, submitted with Plaintiff's First Amended Complaint, *Neo Wireless LLC* v. *Nissan North America Inc. et al.,* Civil Action No. 2:22-cv-11405-TGB (Jul. 20, 2022).
Neo Wireless LLC, Claim Chart—Claim 13 of U.S. Pat. No. 10,075,941, submitted with Plaintiff's First Amended Complaint, *Neo Wireless LLC* v. *Toyota Motor Corporation, et al.,* Civil Action No. 2:22-cv-00093-JRG-RSP (Jun. 24, 2022).
Neo Wireless LLC, Claim Chart—Claim 13 of U.S. Pat. No. 10,075,941, submitted with Plaintiff's First Amended Complaint, *Neo Wireless LLC* v. *General Motor Company et al.,* Civil Action No. 2:22-cv-11407-TGB (Jul. 20, 2022).
Neo Wireless LLC, Claim Chart—Claim 13 of U.S. Pat. No. 10,075,941, submitted with Plaintiff's First Amended Complaint, *Neo Wireless LLC* v. *Tesla Inc.,* Civil Action No. 2:22-cv-11408-TGB (Jul. 20, 2022).

Neo Wireless LLC, Claim Chart—Claim 13 of U.S. Pat. No. 10,075,941, submitted with Plaintiff's First Amended Complaint, *Neo Wireless LLC* v. *Ford Motor Company,* Civil Action No. 2:22-cv-11402-TGB (Jul. 20, 2022).
Neo Wireless LLC, Claim Chart—Claim 13 of U.S. Pat. No. 10,075,941, submitted with Plaintiff's Complaint for Patent Infringement, *Neo Wireless, LLC* v. *Mercedes-Benz USA, LLC,* Civil Action No. 3:22-cv-00780 (Jul. 15, 2022).
Neo Wireless LLC, Claim Chart—Claim 13 of U.S. Pat. No. 10,075,941, submitted with Plaintiff's Complaint for Patent Infringement, *Neo Wireless, LLC* v. *FCA US, LLC,* Civil Action No. 3:22-cv-00780 (Jul. 15, 2022).
Aldinger, "Multicarrier COFDM Scheme in High Bitrate Radio Local Area Networks," 5th IEEE International Symposium on Personal, Indoor, and Mobile Radio Communications, Wireless Networks—Catching the Mobile Future, vol. 3, pp. 969-973 (1994).
Bingham, Theory and Practice of Modem Design, John Wiley and Sons, pp. 1-7, 108-110 (1988).
Chow et al., "A Multichannel Transceiver System for Asymmetric Digital Subscriber Line Service," IEEE Global Telecommunications Conference, GLOBECOM '91: Countdown to the New Millennium, Conference Record, pp. 1992-1996 (1991).
Cimini, "Analysis and Simulation of a Digital Mobile Channel Using Orthogonal Frequency Division Multiplexing," IEEE Transactions on Communications, vol. Com-33, No. 7, pp. 665-675 (Jul. 1985).
Eklund et al., "IEEE Standard 802.16: A Technical Overview of the WirelessMAN Air Interface for Broadband Wireless Access," IEEE Communications Magazine (Jun. 2002).
Eklund et al., WirelessMAN Inside the IEEE 802.16 Standard for Wireless Metropolitan Networks (2006).
Lawrey, "Multiuser OFDM," Fifth International Symposium on Signal Processing and its Applications, ISSPA '99, Brisbane, Australia (Aug. 22-25, 1999).
Le Floch et al., "Digital Sound Broadcasting to Mobile Receivers," IEEE Transactions on Consumer Electronics, vol. 35, No. 3, pp. 493-503 (1989).
Monsen, "Theoretical and Measured Performance of a DFE Modem on a Fading Multipath Channel," IEEE Transactions on Communications, vol. Com-25, No. 10, pp. 1144-1153 (Oct. 1977).
Reiners et al., "Multicarrier Transmission Technique in Cellular Mobile Communications Systems," Proceedings of the IEEE Vehicular Technology Conference, vol. 3, pp. 1645-1649 (1994).
Saltzberg, "Performance of an Efficient Parallel Data Transmission System," IEEE Transactions on Communication Technology, vol. 15, No. 6, pp. 805-811 (1967).
Tufvesson et al., "Pilot Assisted Channel Estimation for OFDM in Mobile Cellular Systems," IEEE 47th Vehicular Technology Conference, Technology in Motion (May 4-7, 1997).
*Volkswagen Group of America, Inc.* v. *Neo Wireless LLC*, Declaration of Sarah Kate Wilson, Ph D., Case No. IPR2022-01537, U.S. Pat. No. 10,075,941 (Sep. 14, 2022).
*Volkswagen Group of America, Inc.* v. *Neo Wireless LLC*, Petition for Inter Partes Review of U.S. Pat. No. 10,075,941, Case IPR2022-01537 (Sep. 15, 2022).
Wahlqvist et al., "A Conceptual Study of OFDM-based Multiple Access Schemes: Part 1: Air Interface Requirements," Telia Research AB, Lulea (1996).
Weinstein et al., "Data Transmission by Frequency-Division Multiplexing Using the Discrete Fourier Transform," IEEE Transactions on Communications Technology, vol. 19, No. 4, pp. 628-634 (1971).
*Neo Wireless, LLC* v. *American Honda Motor Co., Inc.* et al. and *Neo Wireless, LLC* v. *Nissan North America Inc.,* et al., Defendants Honda and Nissan's Reply Brief in Support of their Motion to Dismiss Plaintiff's Claims of Willful and Induced Patent Infringement, Case No. 2:22-cv-11403-TGB and Case No. 2:22-cv-11405-TGB (Sep. 14, 2022).
*Neo Wireless, LLC* v. *FCA US, LLC,* Defendant FCA US LLC's Answer and Defenses to Neo Wireless, LLC's Complaint, Case No. 2:22-cv-11770-TGB (Sep. 12, 2022).

(56) References Cited

OTHER PUBLICATIONS

*Neo Wireless, LLC* v. *Ford Motor Company*, Neo Wireless, LLC's Answer to Ford Motor Company's Counterclaims, Case: 2:22-cv-11402-TGB (Sep. 14, 2022).

*Neo Wireless, LLC* v. *Mercedes-Benz USA, LLC*, Defendant Mercedes-Benz USA, LLC's Motion to Dismiss under Rule 12(b)(6), Case No. 2:22;CV-11769-TGB (Sep. 12, 2022).

*Neo Wireless, LLC* v. *Mercedes-Benz USA, LLC*, Defendant Mercedes-Benz USA's partial Answer to Plaintiff Neo Wireless, LLC's Complaint for Patent Infringement, Case No. 2:22-CV-11769-TGB (Sep. 29, 2022).

*Neo Wireless, LLC* v. *Mercedes-Benz USA, LLC* Plaintiff Neo Wireless, LLC's Response to Defendant Mercedez-Benz USA, LLC's Motion to Dismiss Pursuant to Federal Rule of Civil Procedure 12(B)(6), Case No. 2:22-CV-11769-TGB (Oct. 3, 2022).

*Neo Wireless, LLC* v. *Volkswagen Group of America, Inc.*, et al., Volkswagen Defendants' Reply in Support of their Motion to Dismiss Pursuant to Federal Rule of Civil Procedure 12(b)(6), Case No. 2:22-cv-11404 (Sep. 14, 2022).

\* cited by examiner

METHODS AND APPARATUS FOR MULTI-CARRIER COMMUNICATION SYSTEMS WITH ADAPTIVE TRANSMISSION AND FEEDBACK

CROSS-REFERENCE TO RELATED APPLICATION(S)

This application is a continuation of U.S. patent application Ser. No. 17/341,871, filed Jun. 8, 2021, which is a continuation of U.S. patent application Ser. No. 17/094,286, filed Nov. 10, 2020, which issued as U.S. Pat. No. 11,032, 801 on Jun. 8, 2021, which is a continuation of U.S. patent application Ser. No. 16/126,896, filed Sep. 10, 2018, which issued as U.S. Pat. No. 10,834,706 on Nov. 10, 2020, which is a continuation of U.S. patent application Ser. No. 15/082, 878, filed Mar. 28, 2016, which issued as U.S. Pat. No. 10,075,941 on Sep. 11, 2018, which is a continuation of U.S. patent application Ser. No. 14/539,917, filed Nov. 12, 2014, which issued as U.S. Pat. No. 9,301,296 on Mar. 29, 2016, which is a continuation of U.S. patent application Ser. No. 13/246,677, filed on Sep. 27, 2011, which is a continuation of U.S. patent application Ser. No. 12/755,313, filed on Apr. 6, 2010, which issued as U.S. Pat. No. 8,027,367 on Sep. 27, 2011, which is a continuation of U.S. patent application Ser. No. 10/583,529, filed on May 10, 2007, which issued as U.S. Pat. No. 7,693,032 on Apr. 6, 2010, which is a National Stage Entry of PCT/US2005/004601, filed on Feb. 14, 2005, which claims the benefit of U.S. Provisional Application No. 60/544,521, filed on Feb. 13, 2004, which is/are incorporated by reference as if fully set forth. This application also relates to PCT Application No. PCT/US05/03518 titled "Methods and Apparatus for Overlaying Multi-Carrier and Direct Sequence Spread Spectrum Signals in a Broadband Wireless Communication System," filed Jan. 27, 2005, which claims the benefit of U.S. Provisional Application No. 60/540,032 filed Jan. 29, 2004 and U.S. Provisional Application No. 60/540,586 filed Jan. 30, 2004, the contents of which are incorporated herein by reference.

BACKGROUND

Adaptive modulation and coding (AMC) has been used in wireless systems to improve spectral efficiency in a fading environment where signal quality varies significantly. By adjusting the modulation and coding scheme (MCS) in accordance with the varying signal-to-interference-plus-noise ratio (SINR), reliable communication link can be maintained between communicating devices. For example, in CDMA2000 1×EV-DO system, twelve different modulation/coding schemes are provided. AMC is also used in CDMA2000 1×EV-DV and 3GPP HSDPA systems.

To improve performance, in addition to the MCS, other system functions such as channel estimation, transmission power control (TPC), and subchannel configuration can be adjusted in accordance with the state of the communication channel. For example, channel estimation typically utilizes training symbols or pilot data, which are known to both the transmitter and the receiver. For coherent modulation, the channel information can be extracted at the receiver by comparing the pilots and their corresponding received versions. For non-coherent modulation, the received samples of the pilots are used as reference for the detection of the transmitted data.

Channel estimation is an important part of multi-carrier (MC) communication systems such as Orthogonal Frequency Division Multiplexing (OFDM) systems. In conventional OFDM systems, such as IEEE802.11a, 802.11g, 802.16, or DVB-T system, pilots are transmitted for channel estimation. The pilots are fixed and form part of other functions such as MCS, TPC, and subchannel configuration in some wireless systems.

Fast TPC can compensate for fast fading. In a multi-cell multiple-access system, TPC is also used to reduce intra-cell and inter-cell interference and to conserve battery life for the mobile station by transmitting with only necessary power. TPC is one of many functions in some wireless systems, along with MCS, pilot attributes, subchannel configuration, etc.

The subchannel configuration is normally defined and fixed in an operation, and it is usually not considered an adjustable function of the system to be adapted to the user profile and/or operational environment.

DETAILED DESCRIPTION

Methods and apparatus for adaptive transmission of wireless communication signals are described, where MCS (modulation and coding scheme), coding rates, training pilot patterns, TPC (transmission power control) levels, and subchannel configurations are jointly adjusted to adapt to the channel conditions. This adaptation maximizes the overall system capacity and spectral efficiency without wasting radio resources or compromising error probability performance.

Furthermore, the subchannel composition is designed to be configurable so that it can be adjusted statically or dynamically according to the user profiles or environmental conditions. The methods for obtaining the channel information and for transmitting the control information in the joint adaptation scheme are also described below, such as feedback of channel condition and indexing of the joint scheme, along with methods for reducing the overhead of messaging.

The mentioned multi-carrier system can be of any special format such as OFDM, or Multi-Carrier Code Division Multiple Access (MC-CDMA) and can be applied to downlink, uplink, or both, where the duplexing technique is either Time Division Duplexing (TDD) or Frequency Division Duplexing (FDD).

The apparatus and methods are described with respect to various embodiments and provide specific details for a thorough understanding and enablement. One skilled in the art will understand that the invention may be practiced without such details. In some instances well-known structures and functions are not shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
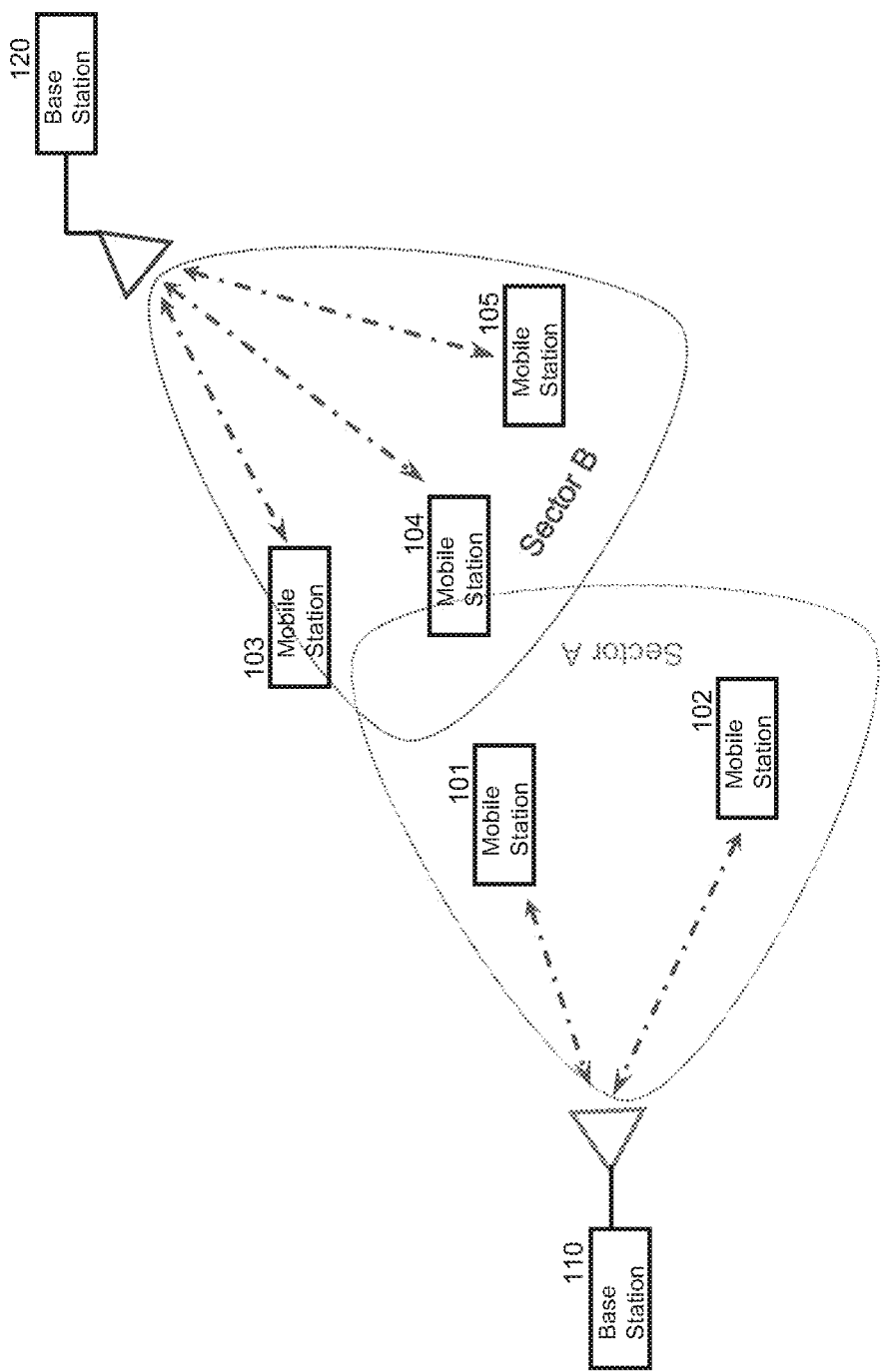
FIG. 1 is a representative cellular communication system.

The content of this description is applicable to a communication system with multiple transmitters and multiple receivers. For example, in a wireless network, there are a number of base stations, each of which provides coverage to its designated area, typically called a cell. Within each cell, there are mobile stations. FIG. 1 illustrates a communication system that is representative of such a system, where Base Station 110 is communicating with Mobile Stations 101 and 102 in Sector A of its cell site while Base Station 120 is communicating with Mobile Stations 103, 104, and 105 in Sector B of its cell site.

A multi-carrier multiple-access system is a special case of general communication systems and hereinafter is employed as a representative communication system to describe the embodiments of the invention.

Multi-Carrier Communication System

The physical media resource (e.g., radio or cable) in a multi-carrier communication system can be divided in both the frequency and the time domains. This canonical division provides a high flexibility and fine granularity for resource sharing.

The basic structure of a multi-carrier signal in the frequency domain is made up of subcarriers. Within a particular spectral band or channel, there are a fixed number of subcarriers, and there are three types of subcarriers:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard bands and DC carrier.

Figure 2:
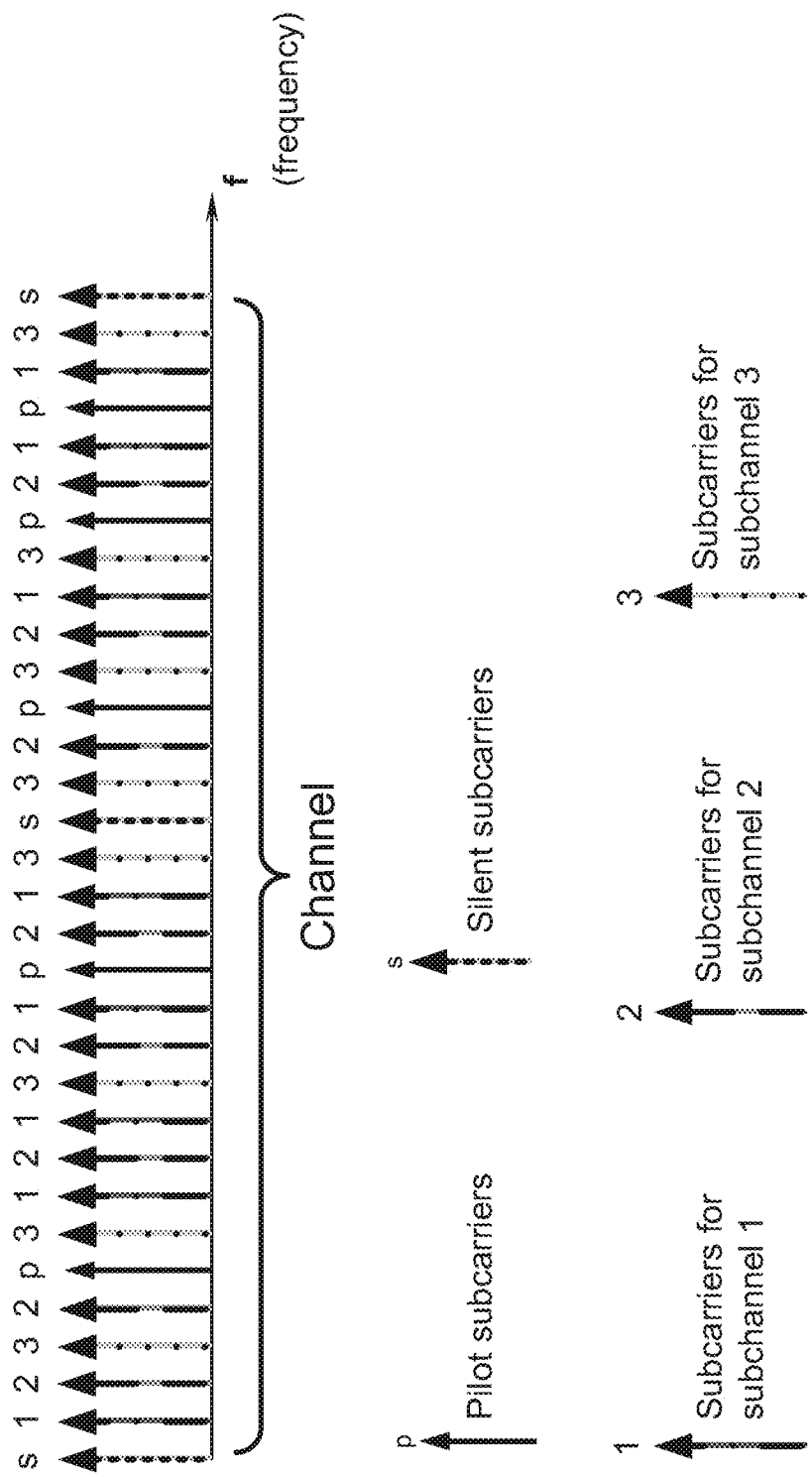
FIG. 2 is a basic structure of a multi-carrier signal in the frequency domain, made up of subcarriers.

The data subcarriers can be arranged into groups called subchannels to support scalability and multiple-access. The carriers forming one subchannel are not necessarily adjacent to each other. Each user may use part or all of the subchannels. The concept is illustrated in FIG. 2, which is the basic structure of a multi-carrier signal in the frequency domain, made up of subcarriers. Data subcarriers can be grouped into subchannels in a specified manner. The pilot subcarriers are also distributed over the entire channel in a specified manner.

Figure 3:
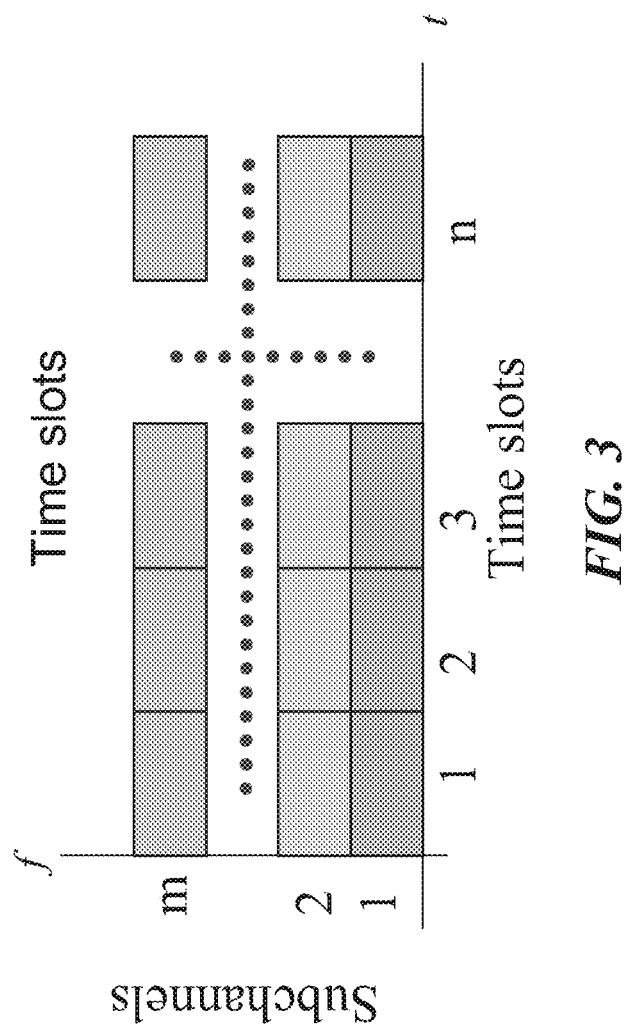
FIG. 3 depicts a radio resource divided into small units in both frequency and time domains: subchannels and time slots.

The basic structure of a multi-carrier signal in the time domain is made up of time slots to support multiple-access. The resource division in both the frequency and time domains is depicted in FIG. 3, which is the radio resource divided into small units in both the frequency and time domains (subchannels and time slots). The basic structure of a multi-carrier signal in the time domain is made up of time slots.

Adaptive Transmission and Feedback

The underlying principles of adaptive transmission and feedback are both to increase the degree of freedom of a transmission process and to supply information for the adaptation process of a communication system. The adaptation process adjusts the allocated modulation schemes, coding rates, pilot patterns, power levels, spatial processing schemes, subchannel configurations, etc. in accordance with the transmission channel state and condition, for improving system performance and/or capacity.

Below, AMCTP (adaptive modulation, coding, training and power control) is used as a general term, where its variations can be applied to appropriate applications. There are different adaptive transmission schemes that are subsets of the AMCTP scheme, such as AMCT (adaptive modulation, coding and training), AMTP (adaptive modulation, training, and power control), AMT (adaptive modulation and training), and so forth.

Figure 4:
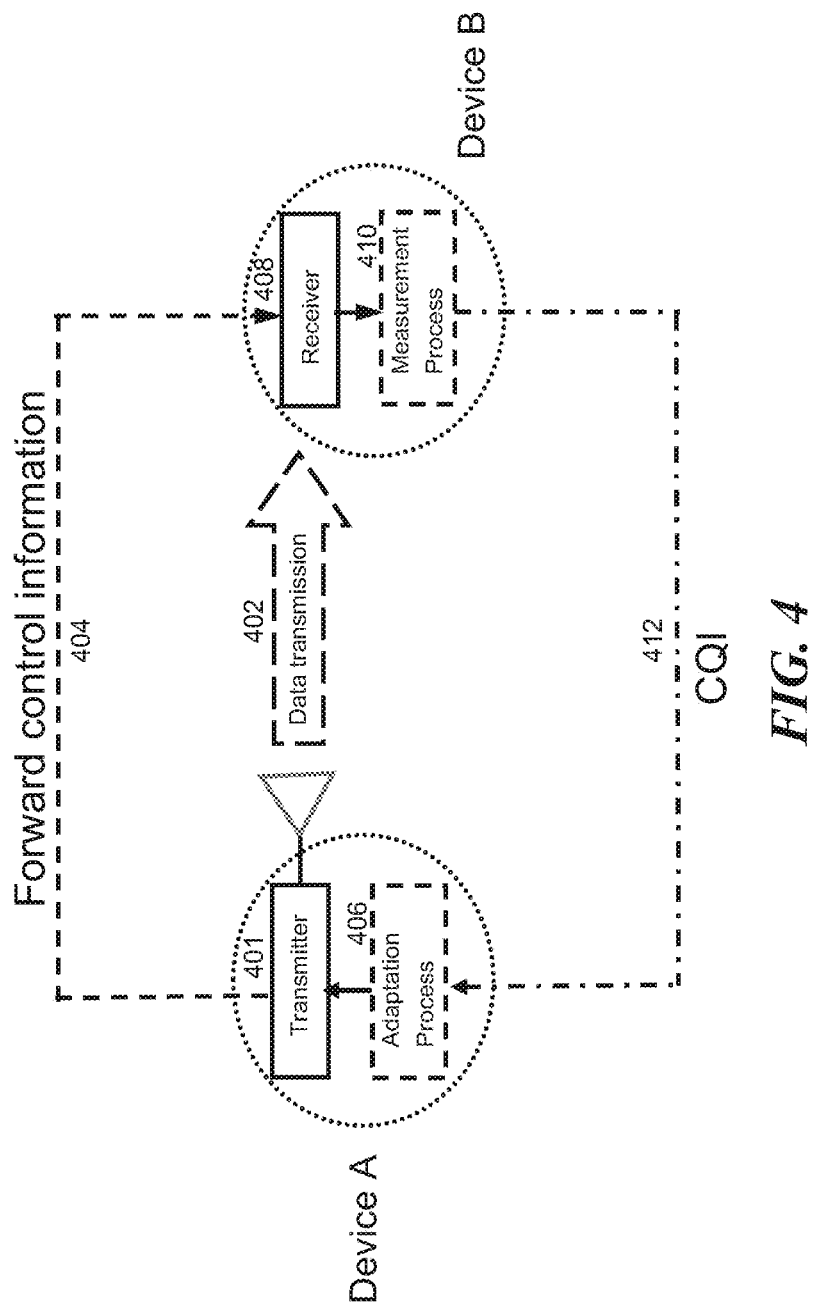
FIG. 4 is an illustration of a control process between Device A and Device B, each of which can be a part of a base station and a mobile station depicted in FIG. 1.

FIG. 4 is an illustration of the control process between Device A and Device B, each of which can be a part of a base station and a mobile station depicted in FIG. 1, during adaptive transmission. The transmitter 401 of Device A transmits data 402 and associated control information 404 to Device B, based on an output of the adaptation process 406. After a receiver 408 of Device B receives the transmitted data 402 and control information 404, a measurement process 410 of Device B measures a channel conditions and feeds a channel quality information (CQI) 412 back to Device A.

The granularity of AMCTP schemes in a multi-carrier system can be user-based, where one or multiple subchannels may be used, or the granularity can be subchannel-based, where a subchannel may contain one or more subcarriers. Likewise, the granularity of CQI can be user- or subchannel-based. Both AMCTP and CQI may change over time and may differ from one time slot to another.

Figure 5:
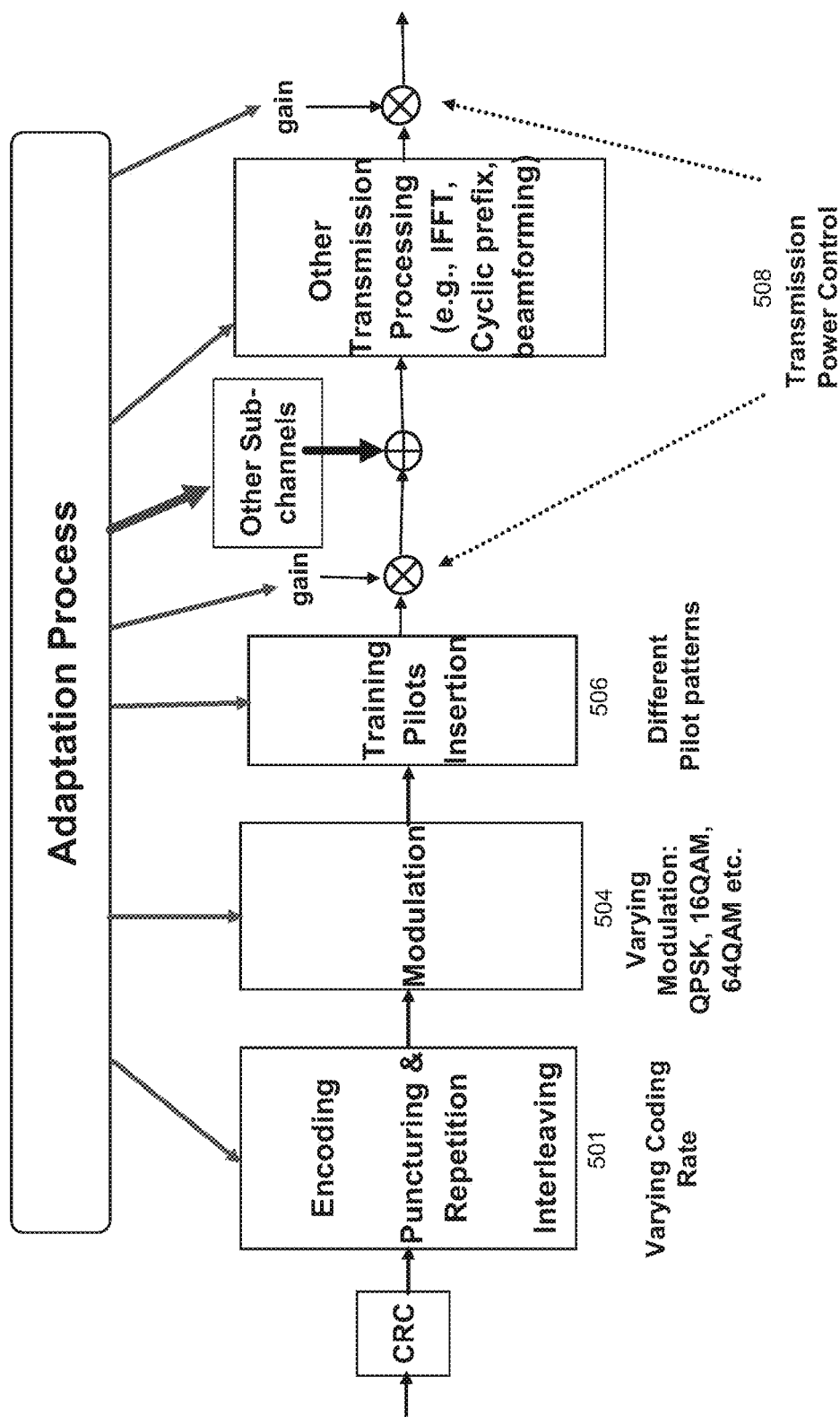
FIG. 5 illustrates a joint adaptation process at a transmitter of an OFDM system which controls coding, modulation, training pilot pattern, and transmission power for a subchannel.

FIG. 5 illustrates a joint adaptation process at a transmitter of an OFDM system which employs separate processing block to control the coding 502, modulation 504, training pilot pattern 506, and transmission power for a subchannel 508. Each block may be implemented combined or separately in circuitry, in dedicated processors, in a digital signal processor, as a microprocessor implemented subroutine, etc.

Figure 6:
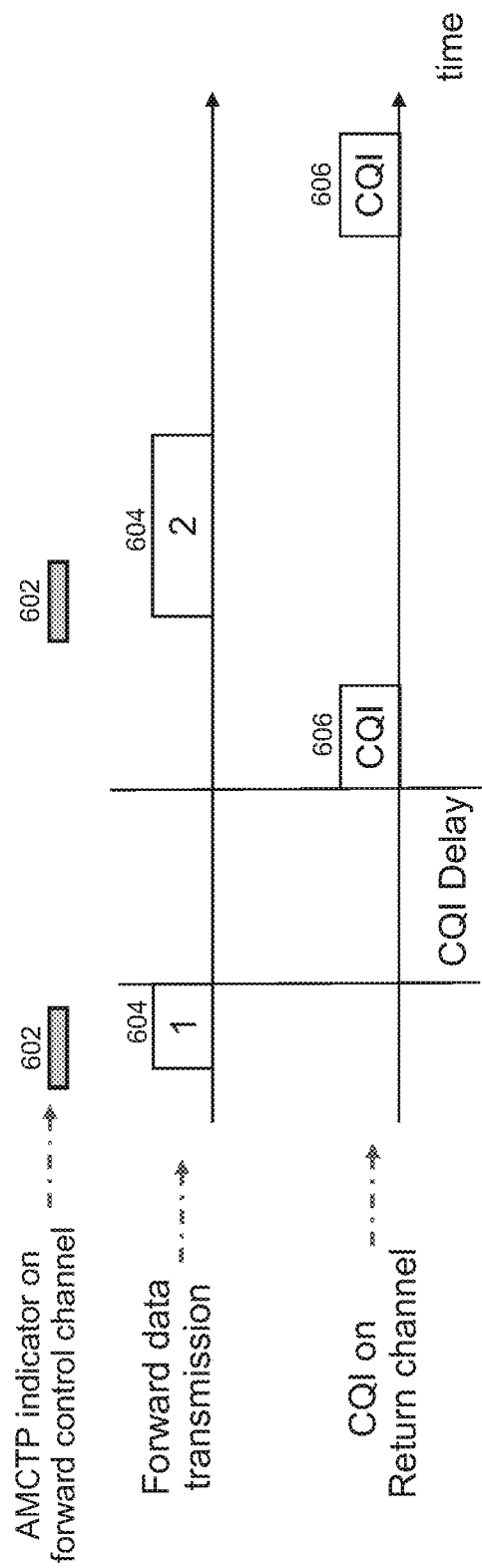
FIG. 6 is an illustration of a control messaging associated with data transmission between communication devices.

FIG. 6 is an illustration of control messaging associated with the data transmission between communication devices, such as Device A and B in FIG. 4. In FIG. 6 the AMCTP indicator 602 is associated with data transmission 604 on a forward link from the transmitter to the receiver, and CQI 606 is associated with the information feedback from the receiver to the transmitter on a return channel.

In a system where AMCTP is used, the transmitter relies on the CQI to select an appropriate AMCTP scheme for transmitting the next packet, or retransmitting a previously failed packet, required in an automatic repeat request (ARQ) process. The CQI is a function of one or more of the following: received signal strength; average SINR; variance in time; frequency or space; measured bit error rate (BER); frame error rate (FER); or mean square error (MSE). Channel conditions hereinafter are referred to as one or more of the following, for a user or a subchannel: signal level, noise level, interference level, SINR, fading channel characteristics (Doppler frequency, delay spread, etc.), or channel profile in time or frequency domain. The detection of the channel condition can be at the transmitter, the receiver, or both.

An MCS in AMCTP is referred to as a modulation and error correction coding scheme used in the system. By matching an MCS to a specific channel condition (e.g., SINR level), a better throughput is achieved. Varying only the MCS is a sub-optimal approach since other factors such as training pilot patterns or subchannel compositions also impact system performance.

A pilot pattern includes the number of (training) pilot symbols, the location of the symbols in time/frequency/space, the amplitude and phase, and other attributes of these symbols. The system may use distinctive pilot patterns to suit different MCS and channel conditions. The pilot pattern requirements for a robust channel estimation vary with the SINR of the channel and the channel profile.

Figure 7:
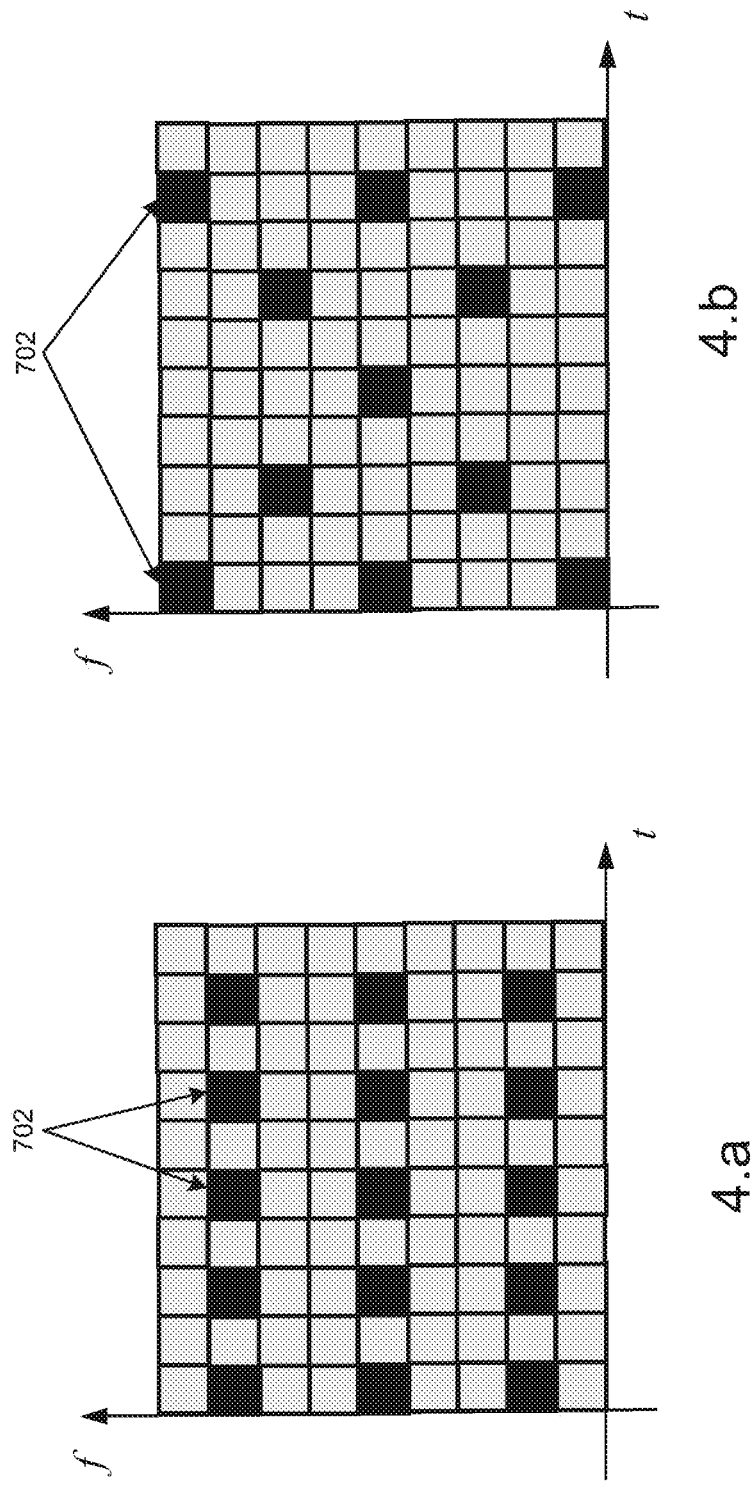
FIG. 7 illustrates two different training pilot patterns plotted for a multi-carrier system.

In a multi-carrier system, pilots are transmitted on certain positions in the time-frequency grid. FIG. 7 illustrates two of many different training pilot patterns that may be used, each plotted for a multi-carrier system, where the dark shaded time-frequency grids 702 are allocated as training pilot symbols. One criterion for choosing a pilot pattern is that the pilot assisted channel estimation should not be a bottleneck for the link performance, and that the pilot overhead should be kept to a minimum. The joined adaptation of training pilot pattern together with MCS is a more effective way of matching the channel conditions, and results in a better performance compared with a mere adaptation of MCS.

The power control information may include an absolute power level and/or a relative amount to increase or decrease the current power setting. In a multi-carrier system, the power levels of different subchannels are set differently such that minimum power is allocated to a subchannel to satisfy its performance requirements while minimizing interference to other users.

Figure 8:
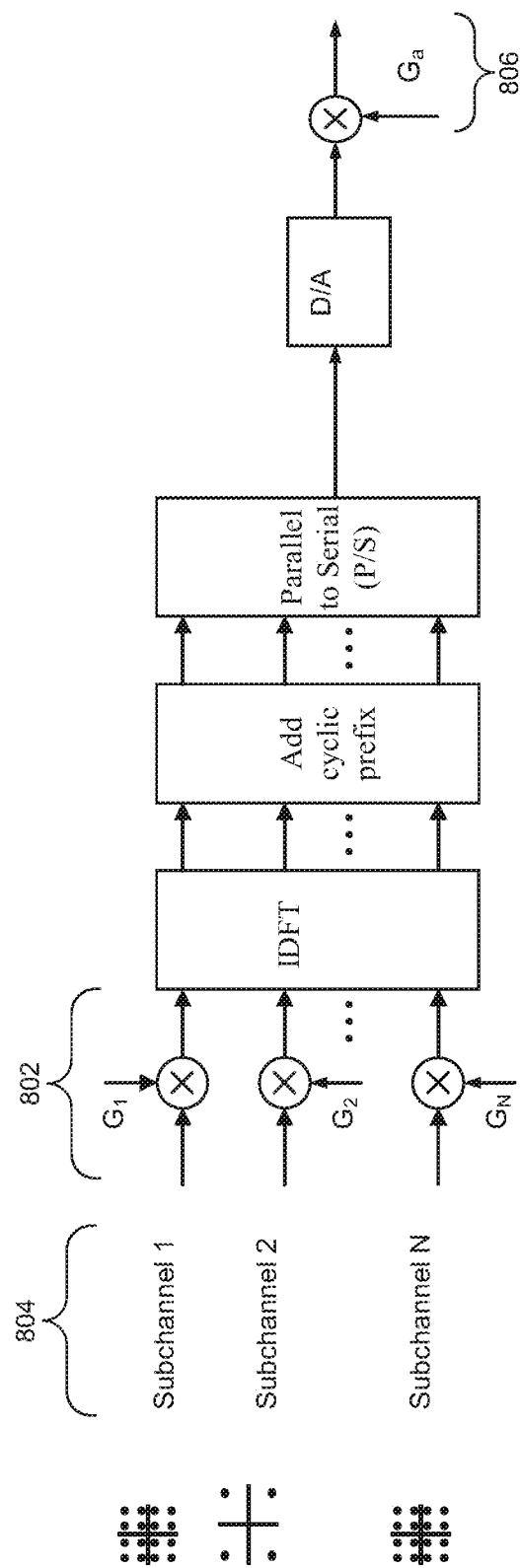
FIG. 8 illustrates a power control in AMCTP scheme for an OFDM system.

The power control can be user- or subchannel-based. FIG. 8 is an illustration of a power control in an OFDM system where digital variable gains 802 G1, G2 . . . GN are applied to subchannels 804 that may have different MCSs with different transmission power levels. Analog domain gain 806 Ga is used to control the total transmission power signal processes to meet the requirements of the transmission power of the device. In FIG. 8, after variable gains are applied to subchannels 804, they are inputted to the inverse discrete Fourier transform (IDFT) module. The outputs from the IDFT are the time domain signals, which are converted from parallel to sequential signals after a cyclic prefix is added to them.

Table 1 is an example of a general AMCTP table (or CQI table). It should be noted that some pilot patterns in the table can be the same. The total number of indexes used to represent different combinations of the joint adaptation process can be different for AMCTP index and CQI index. For instance, it is not necessary to send absolute transmission power information to the receiver(s). Some AMCTP information, such as relative power control or code rate, can be embedded in the data transmission instead of being conveyed in the AMCTP index.

TABLE 1

An example of general AMCTP.

| Index | Modulation | Code Rate | Training Pilot | Transmit Power |
|---|---|---|---|---|
| 1 | QPSK | 1/16 | Pattern 1 | + |
| 2 | QPSK | 1/8 | Pattern 2 | + |
| 3 | QPSK | 1/4 | Pattern 3 | + |
| 4 | QPSK | 1/2 | Pattern 4 | + |
| 5 | QPSK | 1/2 | Pattern 5 | + |
| 6 | 16 QAM | 1/2 | Pattern 6 | + |
| 7 | 16 QAM | 1/2 | Pattern 7 | + |
| 8 | 16 QAM | 3/4 | Pattern 8 | + |
| 9 | 16 QAM | 3/4 | Pattern 9 | + |
| 10 | 64 QAM | 2/3 | Pattern 10 | + |
| 11 | 64 QAM | 5/6 | Pattern 11 | + |
| 12 | 64 QAM | 5/6 | Pattern 12 | Max-1x |
| 13 | 64 QAM | 5/6 | Pattern 13 | Max-2x |
| 14 | 64 QAM | 5/6 | Pattern 14 | Max-3x |

In a general AMCTP or CQI table, different training pilot patterns may be used for different modulations and code rates. However, even for the same modulation and coding, different patterns can be used to match different channel conditions. In order to make the table more efficient, more indexes can be allocated to the more frequently used scenarios. For example, several training pilot patterns can be allocated to the same MCS that is used more frequently, to achieve finer granularity and thus have a better match with different channel conditions.

Table 2 is a simple realization of the AMCTP index or the CQI index. In one embodiment, as shown in Table 2, the AMCTP and CQI index is Gray coded so that one bit error in the index makes the index shift to the adjacent index.

In some cases, a different number of pilot symbols is used for the same MCS. In one embodiment, to keep the packet size the same when the same MCS is used with a different number of pilot symbols, rate matching schemes such as repetition or puncturing is employed. For instance in Table 2, for Index 010 and Index 011, Pattern 3 has more pilot symbols compared to Pattern 2. The code rate of Index 010 is 1/2, which is punctured to 7/16 for Index 011 to accommodate the extra pilot symbols. In one embodiment, more significant bits in the CQI index are protected with stronger error protection code on the return channel.

TABLE 2

Another example of AMCTP or CQI table.

| Index (Gray coded) | Modulation | Code Rate | Training Pilot | Transmit Power |
|---|---|---|---|---|
| 000 | QPSK | 1/4 | Pattern 1 | Max |
| 010 | QPSK | 1/2 | Pattern 2 | Max |
| 011 | QPSK | 7/16 | Pattern 3 | Max |
| 001 | 16 QAM | 1/2 | Pattern 2 | Max |
| 101 | 16 QAM | 7/16 | Pattern 3 | Max |
| 111 | 64 QAM | 2/3 | Pattern 2 | Max |
| 110 | 64 QAM | 5/6 | Pattern 3 | Max |
| 100 | 64 QAM | 5/6 | Pattern 3 | Max-X |

Other factors that can be used in the adaptation process include modulation constellation arrangements, transmitter antenna techniques, and subchannel configuration in a multi-carrier system.

For some modulation schemes such as 16QAM and 64QAM, how information bits are mapped to a symbol determines the modulation schemes' reliability. In one embodiment, constellation arrangement is adjusted in the adaptation process to achieve a better system performance, especially during retransmission in a hybrid ARQ process.

Some multiple antenna techniques, such as transmission diversity, are used to improve the transmission robustness against fading channel effects, whereas other multiple antenna techniques such as multiple-input multiple-output (MIMO) schemes are used to improve transmission throughput in favorable channel conditions. In one embodiment of the adaptive transmissions the antenna technique used for a transmission is determined by the adaptation process.

In a multi-carrier multi-cell communication system, when all subcarriers in one subchannel are adjacent or close to each other, they are more likely to fall in the coherent bandwidth of a fading channel; thus they can be allocated to users that are either fixed in location or are move slowly. On the other hand, when subcarriers and/or subchannels that belong to one user are scattered in the frequency domain, it results in higher diversity gains for the fast moving users, and a better interference averaging effect.

Given the fact that different configurations of subchannel compositions are suitable for different scenarios or user profiles, subchannel configuration is included in the transmission adaptation process. In one embodiment, the subchannel configuration information is broadcast on the common forward control channel to all users such that each user is informed of its subchannel configuration.

In another embodiment, the subchannel configuration is adjusted according to deployment scenarios. For instance, when a base station is newly deployed with less interference, one form of subchannel configuration is used, and when more users join the network or more adjacent base stations are deployed, which results in stronger interference to the users in the system, a different subchannel configuration with better interference averaging effect is used.

The following paragraphs describe a method of transmitting the control message between the transmitter and receiver, when the AMCTP scheme is implemented. A forward control link is defined here as the transmission of the AMCTP indicator from the transmitter to the receiver, and a return control channel is defined as the transmission of CQI, as the feedback information, from the receiver to the transmitter, as shown in FIG. 4.

The AMCTP indicator on the forward link can be sent either separately or jointly. For instance, the power control information, training pilot pattern indicator, or antenna diversity scheme can be embedded in the data transmission. In another embodiment, AMCTP is transmitted on a separate control channel with stronger error protection.

One way for the transmitter to obtain CQI is to have it explicitly sent from the receiver to the transmitter based on channel condition measurements at the receiver during previous transmission(s). The CQI is then used by the transmitter to determine what AMCTP scheme to use for the next transmission. In one embodiment, CQI for one user is periodically updated on the return channel, even when there is no forward transmission targeted for that user. In this case the receiver measures the channel conditions from the common broadcast transmission or the data transmission targeted to other users.

In one embodiment, the transmitter or the receiver uses any of several known predictive algorithms to predict current or future channel conditions based on previous channel measurements. This is more effective for a fast fading environment where the past measurements may not match the current transmission closely, due to the fast channel variations. The output of the predictive algorithm is then used by the adaptation process to select the best possible scheme for the current transmission.

Another method to obtain CQI is through the transmission of a probing sequence from the receiver to the transmitter on the return channel. In one embodiment, in a multi-carrier communication system, a probing sequence is transmitted from the receiver to the transmitter using an overlay scheme where the probing sequence is overlaid to the data traffic without having negative impact on the data transmission performance. In this case the transmitter estimates the channel profile in the time and/or frequency domains based on the received probing sequence. This is especially effective for TDD systems due to the reciprocity of the channel conditions on forward and reverse channels.

The AMCTP indicator or CQI can be sent per user or per subchannel. In one embodiment if per subchannel feedback is employed, since the AMCTP and CQI information for the same users are highly correlated, first the source coding is employed to compress the CQI, and then the error correction coding is applied to the compressed CQI to provide sufficient error protection.

In another embodiment, in hybrid ARQ retransmission, the transmitter may not use the requested CQI for the retransmission, while it may use the requested CQI for a new packet transmission. Instead, in this embodiment, it selects an AMCTP scheme that is appropriate for the retransmission at the same power level as in the previous transmission(s), in order to reduce interference with other users.

It should be pointed out that the AMCTP index used for the transmission from the transmitter to the receiver may be different from the CQI that the receiver requested, because the transmitter may have other considerations such as quality of service (QoS) for different users, network traffic load, and power allocation limit.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

What is claimed is:

1. A first station served by a second station that uses one or more subchannels within a channel, the channel comprising a plurality of orthogonal frequency division duplex (OFDM) subcarriers and each subchannel of the one or more subchannels using multiple data OFDM subcarriers from the plurality of OFDM subcarriers of the channel, the first station comprising:
   a receiver; and
   a processor;
   wherein the receiver and the processor are configured to:
      receive control information from the second station, the control information indicating a first set of transmission parameters to be used for receiving a first transmission; and
      receive the first transmission, the first transmission having a first subchannel, a first modulation and coding scheme (MCS) of a plurality of MCSs, a first pilot pattern of a plurality of pilot patterns, and a first subchannel configuration of a plurality of subchannel configurations;
   wherein the first subchannel configuration, the first MCS, and the first pilot pattern are determined based on the first set of transmission parameters, wherein the first set of transmission parameters are based at least in part on first channel conditions, and wherein the first set of transmission parameters indicates a multiple input multiple output (MIMO) scheme from a set of MIMO schemes.

2. The first station of claim 1, wherein at least two of: the first subchannel configuration, the first MCS, and the first pilot pattern are determined from a single received transmission parameter.

3. The first station of claim 1, wherein a single index value within the first set of transmission parameters indicates a modulation and a code rate of the first MCS.

4. The first station of claim 1, wherein the first subchannel is from at least two subchannels in the channel, wherein the multiple data OFDM subcarriers of the first subchannel include a plurality of consecutive data OFDM subcarriers.

5. The first station of claim 1, wherein the receiver and the processor are further configured to:
   receive second control information from the second station, the second control information indicating a second set of transmission parameters to be used for receiving a second transmission; and
   receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions.

6. The first station of claim 5, further comprising a transmitter, wherein the transmitter and the processor are configured to:
   transmit a respective channel quality information for each subchannel of the plurality of subchannels.

7. The first station of claim 5, wherein a first ratio of pilot OFDM subcarriers to data OFDM subcarriers of the first transmission is different than a second ratio of pilot OFDM subcarriers to data OFDM subcarriers of the second transmission and further wherein the first pilot pattern is based on the first channel conditions and the second pilot pattern is based on the second channel conditions.

8. The first station of claim 7, wherein the first ratio of pilot OFDM subcarriers and the second ratio of pilot OFDM subcarriers are based on minimizing pilot overhead.

9. The first station of claim 5, wherein the second MCS is the same value as the first MCS.

10. The first station of claim 5, wherein the second pilot pattern is applied at a user-based granularity, wherein the second pilot pattern spans multiple subchannels.

11. The first station of claim 5, wherein OFDM subcarriers used for the first pilot pattern differ from OFDM subcarriers used for the second pilot pattern.

12. The first station of claim 5, wherein the plurality of subchannels includes a first and second data OFDM subcarrier and the second subchannel configuration configures the plurality of subchannels such that the first and second data OFDM subcarrier are separated by multiple OFDM subcarriers in the channel that are not used to send data in the plurality of subchannels.

13. The first station of claim 1, wherein the receiver and the processor are further configured to:
   receive second control information from the second station, the second control information indicating a second set of transmission parameters to be used for receiving a second transmission; and
   receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions.

14. The first station of claim 13, wherein the channel includes a first OFDM subcarrier, the first OFDM subcarrier is used in the first subchannel to receive data in the first transmission using the first subchannel configuration; and the first OFDM subcarrier is not used in the first subchannel to receive data in the second transmission using the second subchannel configuration.

15. The first station of claim 13, wherein OFDM subcarriers used for the first pilot pattern are the same as OFDM subcarriers used for the second pilot pattern and at least one OFDM subcarrier used for both the first and second pilot patterns has different amplitude and phase values as between the first and second pilot patterns.

16. The first station of claim 1, wherein the first MCS is determined from a received index value of a set of index values, and wherein a first index value of the set of index values indicates a first indicated MCS that uses QPSK and ½ code rate, a second index value of the set of index values indicates a second indicated MCS that uses 16QAM and ½ code rate, a third index value of the set of index values indicates a third indicated MCS that uses 16QAM and ¾ code rate, a fourth index value of the set of index values indicates a fourth indicated MCS that uses 64QAM and ⅔ code rate, and a fifth index value of the set of index values indicates a fifth indicated MCS that uses 64QAM and ⅚ code rate.

17. The first station of claim 1, wherein the first channel conditions are detected at both the first station and the second station.

18. The first station of claim 1, further comprising a transmitter, wherein the transmitter and the processor are configured to:
transmit channel quality information to the second station prior to receiving the control information, wherein the channel quality information is determined based on a probing sequence transmission.

19. The first station of claim 1, further comprising a transmitter, wherein the transmitter and the processor are configured to:
transmit channel quality information to the second station prior to receiving the control information, wherein the channel quality information is explicitly transmitted from the first station to the second station and the channel quality information is a function of a signal level and a noise level.

20. The first station of claim 1, further comprising a transmitter, wherein the transmitter and the processor are configured to:
transmit channel quality information to the second station prior to receiving the control information, wherein the channel quality information indicates information used to request transmission parameters and the first set of transmission parameters at least in part override the requested transmission parameters.

21. The first station of claim 1, wherein the first transmission uses one of a plurality of available multiple antenna techniques, the available multiple antenna techniques including transmission diversity and MIMO and the multiple antenna technique used by the first transmission is determined based on the first set of transmission parameters.

22. The first station of claim 1, wherein a single index determines the first pilot pattern, the first MCS, and the first subchannel configuration.

23. The first station of claim 1, wherein the first set of transmission parameters are received on a separate control channel from the first transmission and the first set of transmission parameters has stronger error protection than the first transmission.

24. The first station of claim 1, further comprising a transmitter, wherein the transmitter and the processor are configured to:
perform user-based power control that is determined based on user-specific power control information.

25. The first station of claim 1, wherein the first subchannel configuration is based on the first channel conditions and a user profile.

26. The first station of claim 1, wherein the first subchannel configuration determines an arrangement of the multiple data OFDM subcarriers of the first subchannel among OFDM subcarriers in the channel that are not used to send data in the first subchannel.

27. The first station of claim 26, wherein a plurality of subchannel configurations includes the first subchannel configuration and a second subchannel configuration, the first subchannel configuration characterized by the arrangement of the multiple data OFDM subcarriers of the first subchannel such that the multiple data OFDM subcarriers of the first subchannel are adjacent within the channel and the second subchannel configuration characterized by an arrangement of the multiple data OFDM subcarriers of the first subchannel such that the multiple data OFDM subcarriers of the first subchannel are not adjacent within the channel.

28. The first station of claim 1, wherein the plurality of OFDM subcarriers of the channel comprise at least one silent OFDM subcarrier and the OFDM subcarriers in the channel that are not used to send data in the first subchannel include the at least one silent OFDM subcarrier.

29. The first station of claim 28, wherein the first subchannel configuration configures the multiple data OFDM subcarriers of the first subchannel such that a first and second data OFDM subcarrier within the first subchannel are separated by a single silent OFDM subcarrier within the channel.

30. A first station served by a second station that uses one or more subchannels within a channel, the channel comprising a plurality of orthogonal frequency division duplex (OFDM) subcarriers and each subchannel of the one or more subchannels using multiple data OFDM subcarriers from the plurality of OFDM subcarriers of the channel, the first station comprising:
a receiver; and
a processor;
wherein the receiver and the processor are configured to:
receive control information from the second station, the control information indicating a first set of transmission parameters to be used for receiving a first transmission; and
receive the first transmission, the first transmission having a first subchannel, a first modulation and coding scheme (MCS) of a plurality of MCSs, a first pilot pattern of a plurality of pilot patterns, and a first subchannel configuration of a plurality of subchannel configurations;
wherein the first subchannel configuration, the first MCS, and the first pilot pattern are determined based on the first set of transmission parameters, and wherein the first set of transmission parameters are based at least in part on first channel conditions; and
wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions.

31. The first station of claim 30, wherein at least two of: the first subchannel configuration, the first MCS, and the first pilot pattern are determined from a single received transmission parameter.

32. The first station of claim 30, wherein a single index value within the first set of transmission parameters indicates a modulation and a code rate of the first MCS.

33. The first station of claim 30, wherein the first subchannel is from at least two subchannels in the channel, wherein the multiple data OFDM subcarriers of the first subchannel include a plurality of consecutive data OFDM subcarriers.

34. The first station of claim 30, further comprising a transmitter, wherein the transmitter and the processor are configured to:
transmit a respective channel quality information for each subchannel of the plurality of subchannels.

35. The first station of claim 30, wherein a first ratio of pilot OFDM subcarriers to data OFDM subcarriers of the first transmission is different than a second ratio of pilot OFDM subcarriers to data OFDM subcarriers of the second transmission and further wherein the first pilot pattern is based on the first channel conditions and the second pilot pattern is based on the second channel conditions.

36. The first station of claim 35, wherein the first ratio of pilot OFDM subcarriers and the second ratio of pilot OFDM subcarriers are based on minimizing pilot overhead.

37. The first station of claim 30, wherein the second MCS is the same value as the first MCS.

38. The first station of claim 30, wherein the second pilot pattern is applied at a user-based granularity, wherein the second pilot pattern spans multiple subchannels.

39. The first station of claim 30, wherein OFDM subcarriers used for the first pilot pattern differ from OFDM subcarriers used for the second pilot pattern.

40. The first station of claim 30, wherein the plurality of subchannels includes a first and second data OFDM subcarrier and the second subchannel configuration configures the plurality of subchannels such that the first and second data OFDM subcarrier are separated by multiple OFDM subcarriers in the channel that are not used to send data in the plurality of subchannels.

41. The first station of claim 30, wherein the channel includes a first OFDM subcarrier, the first OFDM subcarrier is used in the first subchannel to receive data in the first transmission using the first subchannel configuration; and the first OFDM subcarrier is not used to receive data in the second transmission using the second subchannel configuration.

42. The first station of claim 30, wherein OFDM subcarriers used for the first pilot pattern are the same as OFDM subcarriers used for the second pilot pattern and at least one OFDM subcarrier used for both the first and second pilot patterns has different amplitude and phase values as between the first and second pilot patterns.

43. The first station of claim 30, wherein the first MCS is determined from a received index value of a set of index values, and wherein a first index value of the set of index values indicates a first indicated MCS that uses QPSK and ½ code rate, a second index value of the set of index values indicates a second indicated MCS that uses 16QAM and ½ code rate, a third index value of the set of index values indicates a third indicated MCS that uses 16QAM and ¾ code rate, a fourth index value of the set of index values indicates a fourth indicated MCS that uses 64QAM and ⅔ code rate, and a fifth index value of the set of index values indicates a fifth indicated MCS that uses 64QAM and ⅚ code rate.

44. The first station of claim 30, wherein the first channel conditions are detected at both the first station and the second station.

45. The first station of claim 30, further comprising a transmitter, wherein the transmitter and the processor are configured to:
transmit channel quality information to the second station prior to receiving the control information, wherein the channel quality information is determined based on a probing sequence transmission.

46. The first station of claim 30, further comprising a transmitter, wherein the transmitter and the processor are configured to:
transmit channel quality information to the second station prior to receiving the control information, wherein the channel quality information is explicitly transmitted from the first station to the second station and the channel quality information is a function of a signal level and a noise level.

47. The first station of claim 30, further comprising a transmitter, wherein the transmitter and the processor are configured to:
transmit channel quality information to the second station prior to receiving the control information, wherein the channel quality information indicates information used to request transmission parameters and the first set of transmission parameters at least in part override the requested transmission parameters.

48. The first station of claim 30, wherein the first transmission uses one of a plurality of available multiple antenna techniques, the available multiple antenna techniques including transmission diversity and multiple-input multiple-output (MIMO) and the multiple antenna technique used by the first transmission is determined based on the first set of transmission parameters.

49. The first station of claim 30, wherein a single index determines the first pilot pattern, the first MCS, and the first subchannel configuration.

50. The first station of claim 30, wherein the first set of transmission parameters are received on a separate control channel from the first transmission and the first set of transmission parameters has stronger error protection than the first transmission.

51. The first station of claim 30, further comprising a transmitter, wherein the transmitter and the processor are configured to:
perform user-based power control that is determined based on user-specific power control information.

52. The first station of claim 30, wherein the first subchannel configuration is based on the first channel conditions and a user profile.

53. The first station of claim 30, wherein the first subchannel configuration determines an arrangement of the multiple data OFDM subcarriers of the first subchannel among OFDM subcarriers in the channel that are not used to send data in the first subchannel.

54. The first station of claim 53, wherein the first subchannel configuration is characterized by the arrangement of the multiple data OFDM subcarriers of the first subchannel such that the multiple data OFDM subcarriers of the first subchannel are adjacent within the channel and a third subchannel configuration is characterized by an arrangement of the multiple data OFDM subcarriers of the first subchannel such that the multiple data OFDM subcarriers of the first subchannel are not adjacent within the channel.

55. The first station of claim 30, wherein the plurality of OFDM subcarriers of the channel comprise at least one silent OFDM subcarrier and the OFDM subcarriers in the channel that are not used to send data in the first subchannel include the at least one silent OFDM subcarrier.

56. The first station of claim 55, wherein the first subchannel configuration configures the multiple data OFDM subcarriers of the first subchannel such that a first and second data OFDM subcarrier within the first subchannel are separated by a single silent OFDM subcarrier within the channel.

57. A first station served by a second station that uses one or more subchannels within a channel, the channel comprising a plurality of orthogonal frequency division duplex (OFDM) subcarriers and each subchannel of the one or more subchannels using multiple data OFDM subcarriers from the plurality of OFDM subcarriers of the channel, the first station comprising:
a receiver; and
a processor;
wherein the receiver and the processor are configured to:
receive control information from the second station, the control information indicating a first set of transmission parameters to be used for receiving a first transmission; and
receive the first transmission, the first transmission having a first subchannel, a first modulation and coding scheme (MCS) of a plurality of MCSs, a first pilot pattern of a plurality of pilot patterns, and a first subchannel configuration of a plurality of subchannel configurations;
wherein the first subchannel configuration, the first MCS, and the first pilot pattern are determined based on the first set of transmission parameters, and wherein the first set of transmission parameters are based at least in part on first channel conditions; and
wherein the receiver and the processor are further configured to:
receive second control information from the second station, the second control information indicating a second set of transmission parameters to be used for receiving a second transmission; and
receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions.

58. The first station of claim 57, wherein at least two of: the first subchannel configuration, the first MCS, and the first pilot pattern are determined from a single received transmission parameter.

59. The first station of claim 57, wherein a single index value within the first set of transmission parameters indicates a modulation and a code rate of the first MCS.

60. The first station of claim 57, wherein the first subchannel is from at least two subchannels in the channel, wherein the multiple data OFDM subcarriers of the first subchannel include a plurality of consecutive data OFDM subcarriers.

61. The first station of claim 57, further comprising a transmitter, wherein the transmitter and the processor are configured to:
transmit a respective channel quality information for each subchannel of the at least the first subchannel.

62. The first station of claim 57, wherein a first ratio of pilot OFDM subcarriers to data OFDM subcarriers of the first transmission is different than a second ratio of pilot OFDM subcarriers to data OFDM subcarriers of the second transmission and further wherein the first pilot pattern is based on the first channel conditions and the second pilot pattern is based on the second channel conditions.

63. The first station of claim 62, wherein the first ratio of pilot OFDM subcarriers and the second ratio of pilot OFDM subcarriers are based on minimizing pilot overhead.

64. The first station of claim 57, wherein the second MCS is the same value as the first MCS.

65. The first station of claim 57, wherein the second pilot pattern is applied at a user-based granularity, wherein the second pilot pattern spans multiple subchannels.

66. The first station of claim 57, wherein OFDM subcarriers used for the first pilot pattern differ from OFDM subcarriers used for the second pilot pattern.

67. The first station of claim 57, wherein the at least the first subchannel includes a first and second data OFDM subcarrier and the second subchannel configuration configures the at least the first subchannel such that the first and second data OFDM subcarrier are separated by multiple OFDM subcarriers in the channel that are not used to send data in the at least the first subchannel.

68. The first station of claim 57, wherein the channel includes a first OFDM subcarrier, the first OFDM subcarrier is used in the first subchannel to receive data in the first transmission using the first subchannel configuration; and the first OFDM subcarrier is not used in the first subchannel to receive data in the second transmission using the second subchannel configuration.

69. The first station of claim 57, wherein OFDM subcarriers used for the first pilot pattern are the same as OFDM subcarriers used for the second pilot pattern and at least one OFDM subcarrier used for both the first and second pilot patterns has different amplitude and phase values as between the first and second pilot patterns.

70. The first station of claim 57, wherein the first MCS is determined from a received index value of a set of index values, and wherein a first index value of the set of index values indicates a first indicated MCS that uses QPSK and ½ code rate, a second index value of the set of index values indicates a second indicated MCS that uses 16QAM and ½ code rate, a third index value of the set of index values indicates a third indicated MCS that uses 16QAM and ¾ code rate, a fourth index value of the set of index values indicates a fourth indicated MCS that uses 64QAM and ⅔ code rate, and a fifth index value of the set of index values indicates a fifth indicated MCS that uses 64QAM and ⅚ code rate.

71. The first station of claim 57, wherein the first channel conditions are detected at both the first station and the second station.

72. The first station of claim 57, further comprising a transmitter, wherein the transmitter and the processor are configured to:
transmit channel quality information to the second station prior to receiving the control information, wherein the channel quality information is determined based on a probing sequence transmission.

73. The first station of claim 57, further comprising a transmitter, wherein the transmitter and the processor are configured to:
transmit channel quality information to the second station prior to receiving the control information, wherein the channel quality information is explicitly transmitted from the first station to the second station and the channel quality information is a function of a signal level and a noise level.

74. The first station of claim 57, further comprising a transmitter, wherein the transmitter and the processor are configured to:

transmit channel quality information to the second station prior to receiving the control information, wherein the channel quality information indicates information used to request transmission parameters and the first set of transmission parameters at least in part override the requested transmission parameters.

75. The first station of claim 57, wherein the first transmission uses one of a plurality of available multiple antenna techniques, the available multiple antenna techniques including transmission diversity and multiple-input multiple-output (MIMO) and the multiple antenna technique used by the first transmission is determined based on the first set of transmission parameters.

76. The first station of claim 57, wherein a single index determines the first pilot pattern, the first MCS, and the first subchannel configuration.

77. The first station of claim 57, wherein the first set of transmission parameters are received on a separate control channel from the first transmission and the first set of transmission parameters has stronger error protection than the first transmission.

78. The first station of claim 57, further comprising a transmitter, wherein the transmitter and the processor are configured to:
perform user-based power control that is determined based on user-specific power control information.

79. The first station of claim 57, wherein the first subchannel configuration is based on the first channel conditions and a user profile.

80. The first station of claim 57, wherein the first subchannel configuration determines an arrangement of the multiple data OFDM subcarriers of the first subchannel among OFDM subcarriers in the channel that are not used to send data in the first subchannel.

81. The first station of claim 80, wherein the first subchannel configuration is characterized by the arrangement of the multiple data OFDM subcarriers of the first subchannel such that the multiple data OFDM subcarriers of the first subchannel are adjacent within the channel and a third subchannel configuration is characterized by an arrangement of the multiple data OFDM subcarriers of the first subchannel such that the multiple data OFDM subcarriers of the first subchannel are not adjacent within the channel.

82. The first station of claim 57, wherein the plurality of OFDM subcarriers of the channel comprise at least one silent OFDM subcarrier and the OFDM subcarriers in the channel that are not used to send data in the first subchannel include the at least one silent OFDM subcarrier.

83. The first station of claim 82, wherein the first subchannel configuration configures the multiple data OFDM subcarriers of the first subchannel such that a first and second data OFDM subcarrier within the first subchannel are separated by a single silent OFDM subcarrier within the channel.

84. A first station served by a second station that uses one or more subchannels within a channel, the channel comprising a plurality of orthogonal frequency division duplex (OFDM) subcarriers and each subchannel of the one or more subchannels using multiple data OFDM subcarriers from the plurality of OFDM subcarriers of the channel, the first station comprising:
a receiver; and
a processor;

wherein the receiver and the processor are configured to:
receive control information from the second station, the control information indicating a first set of transmission parameters to be used for receiving a first transmission; and
receive the first transmission, the first transmission having a first subchannel, a first modulation and coding scheme (MCS) of a plurality of MCSs, a first pilot pattern of a plurality of pilot patterns, and a first subchannel configuration of a plurality of subchannel configurations;
wherein the first subchannel configuration, the first MCS, and the first pilot pattern are determined based on the first set of transmission parameters, wherein the first set of transmission parameters are based at least in part on first channel conditions, wherein the first MCS is determined from a received index value of a set of index values, and wherein a first index value of the set of index values indicates a first indicated MCS that uses QPSK and ½ code rate, a second index value of the set of index values indicates a second indicated MCS that uses 16QAM and ½ code rate, a third index value of the set of index values indicates a third indicated MCS that uses 16QAM and ¾ code rate, a fourth index value of the set of index values indicates a fourth indicated MCS that uses 64QAM and ⅔ code rate, and a fifth index value of the set of index values indicates a fifth indicated MCS that uses 64QAM and ⅚ code rate.

85. The first station of claim 84, wherein at least two of: the first subchannel configuration, the first MCS, and the first pilot pattern are determined from a single received transmission parameter.

86. The first station of claim 84, wherein a single index value within the first set of transmission parameters indicates a modulation and a code rate of the first MCS.

87. The first station of claim 84, wherein the first subchannel is from at least two subchannels in the channel, wherein the multiple data OFDM subcarriers of the first subchannel include a plurality of consecutive data OFDM subcarriers.

88. The first station of claim 84, further comprising a transmitter, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the transmitter and the processor are configured to:
transmit a respective channel quality information for each subchannel of the plurality of subchannels.

89. The first station of claim 84, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein a first ratio of pilot OFDM subcarriers to data OFDM subcarriers of the first transmission is different than a second ratio of pilot OFDM subcarriers to data OFDM subcarriers of the second transmission and further wherein the first pilot pattern is based on the first channel conditions and the second pilot pattern is based on the second channel conditions.

90. The first station of claim 89, wherein the first ratio of pilot OFDM subcarriers and the second ratio of pilot OFDM subcarriers are based on minimizing pilot overhead.

91. The first station of claim 84, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the second MCS is the same value as the first MCS.

92. The first station of claim 84, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the second pilot pattern is applied at a user-based granularity, wherein the second pilot pattern spans multiple subchannels.

93. The first station of claim 84, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein OFDM subcarriers used for the first pilot pattern differ from OFDM subcarriers used for the second pilot pattern.

94. The first station of claim 84, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the plurality of subchannels includes a first and second data OFDM subcarrier and the second subchannel configuration configures the plurality of subchannels such that the first and second data OFDM subcarrier are separated by multiple OFDM subcarriers in the channel that are not used to send data in the plurality of subchannels.

95. The first station of claim 84, wherein the receiver and the processor are further configured to:
receive second control information from the second station, the second control information indicating a second set of transmission parameters to be used for receiving a second transmission; and
receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the channel includes a first OFDM subcarrier, the first OFDM subcarrier is used in the first subchannel to receive data in the first transmission using the first subchannel configuration; and the first OFDM subcarrier is not used in the first subchannel to receive data in the second transmission using the second subchannel configuration.

96. The first station of claim 84, wherein the receiver and the processor are further configured to:
receive second control information from the second station, the second control information indicating a second set of transmission parameters to be used for receiving a second transmission; and
receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein OFDM subcarriers used for the first pilot pattern are the same as OFDM subcarriers used for the second pilot pattern and at least one OFDM subcarrier used for both the first and second pilot patterns has different amplitude and phase values as between the first and second pilot patterns.

97. The first station of claim 84, wherein the first channel conditions are detected at both the first station and the second station.

98. The first station of claim 84, further comprising a transmitter, wherein the transmitter and the processor are configured to:
transmit channel quality information to the second station prior to receiving the control information, wherein the channel quality information is determined based on a probing sequence transmission.

99. The first station of claim 84, further comprising a transmitter, wherein the transmitter and the processor are configured to:
transmit channel quality information to the second station prior to receiving the control information, wherein the channel quality information is explicitly transmitted from the first station to the second station and the channel quality information is a function of a signal level and a noise level.

100. The first station of claim 84, further comprising a transmitter, wherein the transmitter and the processor are configured to:
transmit channel quality information to the second station prior to receiving the control information, wherein the channel quality information indicates information used to request transmission parameters and the first set of transmission parameters at least in part override the requested transmission parameters.

101. The first station of claim 84, wherein the first transmission uses one of a plurality of available multiple antenna techniques, the available multiple antenna techniques including transmission diversity and multiple-input multiple-output (MIMO) and the multiple antenna technique used by the first transmission is determined based on the first set of transmission parameters.

102. The first station of claim 84, wherein a single index determines the first pilot pattern, the first MCS, and the first subchannel configuration.

103. The first station of claim 84, wherein the first set of transmission parameters are received on a separate control channel from the first transmission and the first set of transmission parameters has stronger error protection than the first transmission.

104. The first station of claim 84, further comprising a transmitter, wherein the transmitter and the processor are configured to:
perform user-based power control that is determined based on user-specific power control information.

105. The first station of claim 84, wherein the first subchannel configuration is based on the first channel conditions and a user profile.

106. The first station of claim 84, wherein the first subchannel configuration determines an arrangement of the multiple data OFDM subcarriers of the first subchannel among OFDM subcarriers in the channel that are not used to send data in the first subchannel.

107. The first station of claim 106, wherein a plurality of subchannel configurations includes the first subchannel configuration and a second subchannel configuration, the first subchannel configuration characterized by the arrangement of the multiple data OFDM subcarriers of the first subchannel such that the multiple data OFDM subcarriers of the first subchannel are adjacent within the channel and the second subchannel configuration characterized by an arrangement of the multiple data OFDM subcarriers of the first subchannel such that the multiple data OFDM subcarriers of the first subchannel are not adjacent within the channel.

108. The first station of claim 84, wherein the plurality of OFDM subcarriers of the channel comprise at least one silent OFDM subcarrier and the OFDM subcarriers in the channel that are not used to send data in the first subchannel include the at least one silent OFDM subcarrier.

109. The first station of claim 108, wherein the first subchannel configuration configures the multiple data OFDM subcarriers of the first subchannel such that a first and second data OFDM subcarrier within the first subchannel are separated by a single silent OFDM subcarrier within the channel.

110. A first station served by a second station that uses one or more subchannels within a channel, the channel comprising a plurality of orthogonal frequency division duplex (OFDM) subcarriers and each subchannel of the one or more subchannels using multiple data OFDM subcarriers from the plurality of OFDM subcarriers of the channel, the first station comprising:
a receiver;
a transmitter; and
a processor;
wherein the transmitter and the processor are configured to:
transmit channel quality information to the second station prior to receiving control information, wherein the channel quality information indicates information used to request transmission parameters and a first set of transmission parameters at least in part override the requested transmission parameters;
wherein the receiver and the processor are configured to:
receive the control information from the second station, the control information indicating the first set of transmission parameters to be used for receiving a first transmission; and
receive the first transmission, the first transmission having a first subchannel, a first modulation and coding scheme (MCS) of a plurality of MCSs, a first pilot pattern of a plurality of pilot patterns, and a first subchannel configuration of a plurality of subchannel configurations; and
wherein the first subchannel configuration, the first MCS, and the first pilot pattern are determined based on the first set of transmission parameters, and wherein the first set of transmission parameters are based at least in part on first channel conditions.

111. The first station of claim 110, wherein at least two of: the first subchannel configuration, the first MCS, and the first pilot pattern are determined from a single received transmission parameter.

112. The first station of claim 110, wherein a single index value within the first set of transmission parameters indicates a modulation and a code rate of the first MCS.

113. The first station of claim 110, wherein the first subchannel is from at least two subchannels in the channel, wherein the multiple data OFDM subcarriers of the first subchannel include a plurality of consecutive data OFDM subcarriers.

114. The first station of claim 110, further comprising a transmitter, wherein the receiver and the processor are further configured to:
receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the transmitter and the processor are configured to:

transmit a respective channel quality information for each subchannel of the plurality of subchannels.

115. The first station of claim 110, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein a first ratio of pilot OFDM subcarriers to data OFDM subcarriers of the first transmission is different than a second ratio of pilot OFDM subcarriers to data OFDM subcarriers of the second transmission and further wherein the first pilot pattern is based on the first channel conditions and the second pilot pattern is based on the second channel conditions.

116. The first station of claim 115, wherein the first ratio of pilot OFDM subcarriers and the second ratio of pilot OFDM subcarriers are based on minimizing pilot overhead.

117. The first station of claim 110, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the second MCS is the same value as the first MCS.

118. The first station of claim 110, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the second pilot pattern is applied at a user-based granularity, wherein the second pilot pattern spans multiple subchannels.

119. The first station of claim 110, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein OFDM subcarriers used for the first pilot pattern differ from OFDM subcarriers used for the second pilot pattern.

120. The first station of claim 110, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the plurality of subchannels includes a first and second data OFDM subcarrier and the second subchannel configuration configures the plurality of subchannels such that the first and second data OFDM subcarrier are separated by multiple OFDM subcarriers in the channel that are not used to send data in the plurality of subchannels.

121. The first station of claim 110, wherein the receiver and the processor are further configured to:

receive second control information from the second station, the second control information indicating a second set of transmission parameters to be used for receiving a second transmission; and receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the channel includes a first OFDM subcarrier, the first OFDM subcarrier is used in the first subchannel to receive data in the first transmission using the first subchannel configuration; and the first OFDM subcarrier is not used in the first subchannel to receive data in the second transmission using the second subchannel configuration.

122. The first station of claim 110, wherein the receiver and the processor are further configured to:
receive second control information from the second station, the second control information indicating a second set of transmission parameters to be used for receiving a second transmission; and
receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein OFDM subcarriers used for the first pilot pattern are the same as OFDM subcarriers used for the second pilot pattern and at least one OFDM subcarrier used for both the first and second pilot patterns has different amplitude and phase values as between the first and second pilot patterns.

123. The first station of claim 110, wherein the first channel conditions are detected at both the first station and the second station.

124. The first station of claim 110, wherein the channel quality information is determined based on a probing sequence transmission.

125. The first station of claim 110, wherein the channel quality information is explicitly transmitted from the first station to the second station and the channel quality information is a function of a signal level and a noise level.

126. The first station of claim 110, wherein the first transmission uses one of a plurality of available multiple antenna techniques, the available multiple antenna techniques including transmission diversity and multiple-input multiple-output (MIMO) and the multiple antenna technique used by the first transmission is determined based on the first set of transmission parameters.

127. The first station of claim 110, wherein a single index determines the first pilot pattern, the first MCS, and the first subchannel configuration.

128. The first station of claim 110, wherein the first set of transmission parameters are received on a separate control channel from the first transmission and the first set of transmission parameters has stronger error protection than the first transmission.

129. The first station of claim 110, further comprising a transmitter, wherein the transmitter and the processor are configured to:
perform user-based power control that is determined based on user-specific power control information.

130. The first station of claim 110, wherein the first subchannel configuration is based on the first channel conditions and a user profile.

131. The first station of claim 110, wherein the first subchannel configuration determines an arrangement of the multiple data OFDM subcarriers of the first subchannel among OFDM subcarriers in the channel that are not used to send data in the first subchannel.

132. The first station of claim 131, wherein a plurality of subchannel configurations includes the first subchannel configuration and a second subchannel configuration, the first subchannel configuration characterized by the arrangement of the multiple data OFDM subcarriers of the first subchannel such that the multiple data OFDM subcarriers of the first subchannel are adjacent within the channel and the second subchannel configuration characterized by an arrangement of the multiple data OFDM subcarriers of the first subchannel such that the multiple data OFDM subcarriers of the first subchannel are not adjacent within the channel.

133. The first station of claim 110, wherein the plurality of OFDM subcarriers of the channel comprise at least one silent OFDM subcarrier and the OFDM subcarriers in the channel that are not used to send data in the first subchannel include the at least one silent OFDM subcarrier.

134. The first station of claim 133, wherein the first subchannel configuration configures the multiple data OFDM subcarriers of the first subchannel such that a first and second data OFDM subcarrier within the first subchannel are separated by a single silent OFDM subcarrier within the channel.

135. A first station served by a second station that uses one or more subchannels within a channel, the channel comprising a plurality of orthogonal frequency division duplex (OFDM) subcarriers and each subchannel of the one or more subchannels using multiple data OFDM subcarriers from the plurality of OFDM subcarriers of the channel, the first station comprising:
a receiver; and
a processor;
wherein the receiver and the processor are configured to:
receive control information from the second station, the control information indicating a first set of transmission parameters to be used for receiving a first transmission; and
receive the first transmission, the first transmission having a first subchannel, a first modulation and coding scheme (MCS) of a plurality of MCSs, a first pilot pattern of a plurality of pilot patterns, and a first subchannel configuration of a plurality of subchannel configurations;
wherein the first subchannel configuration, the first MCS, and the first pilot pattern are determined based on the first set of transmission parameters, wherein the first set of transmission parameters are based at least in part on first channel conditions, and wherein the first transmission uses one of a plurality of available multiple antenna techniques, the available multiple antenna techniques including transmission diversity and multiple-input multiple-output (MIMO) and the multiple antenna technique used by the first transmission is determined based on the first set of transmission parameters.

136. The first station of claim 135, wherein at least two of: the first subchannel configuration, the first MCS, and the first pilot pattern are determined from a single received transmission parameter.

137. The first station of claim 135, wherein a single index value within the first set of transmission parameters indicates a modulation and a code rate of the first MCS.

138. The first station of claim 135, wherein the first subchannel is from at least two subchannels in the channel, wherein the multiple data OFDM subcarriers of the first subchannel include a plurality of consecutive data OFDM subcarriers.

139. The first station of claim 135, further comprising a transmitter, wherein the receiver and the processor are further configured to:
receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the transmitter and the processor are configured to:

transmit a respective channel quality information for each subchannel of the plurality of subchannels.

140. The first station of claim 135, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein a first ratio of pilot OFDM subcarriers to data OFDM subcarriers of the first transmission is different than a second ratio of pilot OFDM subcarriers to data OFDM subcarriers of the second transmission and further wherein the first pilot pattern is based on the first channel conditions and the second pilot pattern is based on the second channel conditions.

141. The first station of claim 140, wherein the first ratio of pilot OFDM subcarriers and the second ratio of pilot OFDM subcarriers are based on minimizing pilot overhead.

142. The first station of claim 135, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the second MCS is the same value as the first MCS.

143. The first station of claim 135, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the second pilot pattern is applied at a user-based granularity, wherein the second pilot pattern spans multiple subchannels.

144. The first station of claim 135, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein OFDM subcarriers used for the first pilot pattern differ from OFDM subcarriers used for the second pilot pattern.

145. The first station of claim 135, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the plurality of subchannels includes a first and second data OFDM subcarrier and the second subchannel configuration configures the plurality of subchannels such that the first and second data OFDM subcarrier are separated by multiple OFDM subcarriers in the channel that are not used to send data in the plurality of subchannels.

146. The first station of claim 135, wherein the receiver and the processor are further configured to:

receive second control information from the second station, the second control information indicating a second set of transmission parameters to be used for receiving a second transmission; and receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the channel includes a first OFDM subcarrier, the first OFDM subcarrier is used in the first subchannel to receive data in the first transmission using the first subchannel configuration; and the first OFDM subcarrier is not used in the first subchannel to receive data in the second transmission using the second subchannel configuration.

147. The first station of claim 135, wherein the receiver and the processor are further configured to:
  receive second control information from the second station, the second control information indicating a second set of transmission parameters to be used for receiving a second transmission; and
  receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
  wherein OFDM subcarriers used for the first pilot pattern are the same as OFDM subcarriers used for the second pilot pattern and at least one OFDM subcarrier used for both the first and second pilot patterns has different amplitude and phase values as between the first and second pilot patterns.

148. The first station of claim 135, wherein the first channel conditions are detected at both the first station and the second station.

149. The first station of claim 135, further comprising a transmitter, wherein the transmitter and the processor are configured to:
  transmit channel quality information to the second station prior to receiving the control information, wherein the channel quality information is determined based on a probing sequence transmission.

150. The first station of claim 135, further comprising a transmitter, wherein the transmitter and the processor are configured to:
  transmit channel quality information to the second station prior to receiving the control information, wherein the channel quality information is explicitly transmitted from the first station to the second station and the channel quality information is a function of a signal level and a noise level.

151. The first station of claim 135, wherein a single index determines the first pilot pattern, the first MCS, and the first subchannel configuration.

152. The first station of claim 135, wherein the first set of transmission parameters are received on a separate control channel from the first transmission and the first set of transmission parameters has stronger error protection than the first transmission.

153. The first station of claim 135, further comprising a transmitter, wherein the transmitter and the processor are configured to:
  perform user-based power control that is determined based on user-specific power control information.

154. The first station of claim 135, wherein the first subchannel configuration is based on the first channel conditions and a user profile.

155. The first station of claim 135, wherein the first subchannel configuration determines an arrangement of the multiple data OFDM subcarriers of the first subchannel among OFDM subcarriers in the channel that are not used to send data in the first subchannel.

156. The first station of claim 155, wherein a plurality of subchannel configurations includes the first subchannel configuration and a second subchannel configuration, the first subchannel configuration characterized by the arrangement of the multiple data OFDM subcarriers of the first subchannel such that the multiple data OFDM subcarriers of the first subchannel are adjacent within the channel and the second subchannel configuration characterized by an arrangement of the multiple data OFDM subcarriers of the first subchannel such that the multiple data OFDM subcarriers of the first subchannel are not adjacent within the channel.

157. The first station of claim 135, wherein the plurality of OFDM subcarriers of the channel comprise at least one silent OFDM subcarrier and the OFDM subcarriers in the channel that are not used to send data in the first subchannel include the at least one silent OFDM subcarrier.

158. The first station of claim 157, wherein the first subchannel configuration configures the multiple data OFDM subcarriers of the first subchannel such that a first and second data OFDM subcarrier within the first subchannel are separated by a single silent OFDM subcarrier within the channel.

159. A first station served by a second station that uses one or more subchannels within a channel, the channel comprising a plurality of orthogonal frequency division duplex (OFDM) subcarriers and each subchannel of the one or more subchannels using multiple data OFDM subcarriers from the plurality of OFDM subcarriers of the channel, the first station comprising:
  a receiver; and
  a processor;
  wherein the receiver and the processor are configured to:
    receive control information from the second station, the control information indicating a first set of transmission parameters to be used for receiving a first transmission; and
    receive the first transmission, the first transmission having a first subchannel, a first modulation and coding scheme (MCS) of a plurality of MCSs, a first pilot pattern of a plurality of pilot patterns, and a first subchannel configuration of a plurality of subchannel configurations;
  wherein the first subchannel configuration, the first MCS, and the first pilot pattern are determined based on the first set of transmission parameters, wherein the first set of transmission parameters are based at least in part on first channel conditions, and wherein a single index determines the first pilot pattern, the first MCS, and the first subchannel configuration.

160. The first station of claim 159, wherein at least two of: the first subchannel configuration, the first MCS, and the first pilot pattern are determined from a single received transmission parameter.

161. The first station of claim 159, wherein a single index value within the first set of transmission parameters indicates a modulation and a code rate of the first MCS.

162. The first station of claim 159, wherein the first subchannel is from at least two subchannels in the channel, wherein the multiple data OFDM subcarriers of the first subchannel include a plurality of consecutive data OFDM subcarriers.

163. The first station of claim 159, further comprising a transmitter, wherein the receiver and the processor are further configured to:
  receive second control information from the second station, the second control information indicating a second set of transmission parameters to be used for receiving a second transmission; and
  receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the transmitter and the processor are configured to:

transmit a respective channel quality information for each subchannel of the plurality of subchannels.

164. The first station of claim 159, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein a first ratio of pilot OFDM subcarriers to data OFDM subcarriers of the first transmission is different than a second ratio of pilot OFDM subcarriers to data OFDM subcarriers of the second transmission and further wherein the first pilot pattern is based on the first channel conditions and the second pilot pattern is based on the second channel conditions.

165. The first station of claim 164, wherein the first ratio of pilot OFDM subcarriers and the second ratio of pilot OFDM subcarriers are based on minimizing pilot overhead.

166. The first station of claim 159, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the second MCS is the same value as the first MCS.

167. The first station of claim 159, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the second pilot pattern is applied at a user-based granularity, wherein the second pilot pattern spans multiple subchannels.

168. The first station of claim 159, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein OFDM subcarriers used for the first pilot pattern differ from OFDM subcarriers used for the second pilot pattern.

169. The first station of claim 159, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the plurality of subchannels includes a first and second data OFDM subcarrier and the second subchannel configuration configures the plurality of subchannels such that the first and second data OFDM subcarrier are separated by multiple OFDM subcarriers in the channel that are not used to send data in the plurality of subchannels.

170. The first station of claim 159, wherein the receiver and the processor are further configured to:

receive second control information from the second station, the second control information indicating a second set of transmission parameters to be used for receiving a second transmission; and receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the channel includes a first OFDM subcarrier, the first OFDM subcarrier is used in the first subchannel to receive data in the first transmission using the first subchannel configuration; and the first OFDM subcarrier is not used in the first subchannel to receive data in the second transmission using the second subchannel configuration.

171. The first station of claim 159, wherein the receiver and the processor are further configured to:
   receive second control information from the second station, the second control information indicating a second set of transmission parameters to be used for receiving a second transmission; and
   receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
   wherein OFDM subcarriers used for the first pilot pattern are the same as OFDM subcarriers used for the second pilot pattern and at least one OFDM subcarrier used for both the first and second pilot patterns has different amplitude and phase values as between the first and second pilot patterns.

172. The first station of claim 159, wherein the first channel conditions are detected at both the first station and the second station.

173. The first station of claim 159, further comprising a transmitter, wherein the transmitter and the processor are configured to:
   transmit channel quality information to the second station prior to receiving the control information, wherein the channel quality information is determined based on a probing sequence transmission.

174. The first station of claim 159, further comprising a transmitter, wherein the transmitter and the processor are configured to:
   transmit channel quality information to the second station prior to receiving the control information, wherein the channel quality information is explicitly transmitted from the first station to the second station and the channel quality information is a function of a signal level and a noise level.

175. The first station of claim 159, wherein the first set of transmission parameters are received on a separate control channel from the first transmission and the first set of transmission parameters has stronger error protection than the first transmission.

176. The first station of claim 159, further comprising a transmitter, wherein the transmitter and the processor are configured to:
   perform user-based power control that is determined based on user-specific power control information.

177. The first station of claim 159, wherein the first subchannel configuration is based on the first channel conditions and a user profile.

178. The first station of claim 159, wherein the first subchannel configuration determines an arrangement of the multiple data OFDM subcarriers of the first subchannel among OFDM subcarriers in the channel that are not used to send data in the first subchannel.

179. The first station of claim 178, wherein a plurality of subchannel configurations includes the first subchannel configuration and a second subchannel configuration, the first subchannel configuration characterized by the arrangement of the multiple data OFDM subcarriers of the first subchannel such that the multiple data OFDM subcarriers of the first subchannel are adjacent within the channel and the second subchannel configuration characterized by an arrangement of the multiple data OFDM subcarriers of the first subchannel such that the multiple data OFDM subcarriers of the first subchannel are not adjacent within the channel.

180. The first station of claim 159, wherein the plurality of OFDM subcarriers of the channel comprise at least one silent OFDM subcarrier and the OFDM subcarriers in the channel that are not used to send data in the first subchannel include the at least one silent OFDM subcarrier.

181. The first station of claim 180, wherein the first subchannel configuration configures the multiple data OFDM subcarriers of the first subchannel such that a first and second data OFDM subcarrier within the first subchannel are separated by a single silent OFDM subcarrier within the channel.

182. A first station served by a second station that uses one or more subchannels within a channel, the channel comprising a plurality of orthogonal frequency division duplex (OFDM) subcarriers and each subchannel of the one or more subchannels using multiple data OFDM subcarriers from the plurality of OFDM subcarriers of the channel, the first station comprising:
   a receiver; and
   a processor;
   wherein the receiver and the processor are configured to:
      receive control information from the second station, the control information indicating a first set of transmission parameters to be used for receiving a first transmission; and
      receive the first transmission, the first transmission having a first subchannel, a first modulation and coding scheme (MCS) of a plurality of MCSs, a first pilot pattern of a plurality of pilot patterns, and a first subchannel configuration of a plurality of subchannel configurations;
   wherein the first subchannel configuration, the first MCS, and the first pilot pattern are determined based on the first set of transmission parameters, wherein the first set of transmission parameters are based at least in part on first channel conditions, and wherein the first set of transmission parameters are received on a separate control channel from the first transmission and the first set of transmission parameters has stronger error protection than the first transmission.

183. The first station of claim 182, wherein at least two of: the first subchannel configuration, the first MCS, and the first pilot pattern are determined from a single received transmission parameter.

184. The first station of claim 182, wherein a single index value within the first set of transmission parameters indicates a modulation and a code rate of the first MCS.

185. The first station of claim 182, wherein the first subchannel is from at least two subchannels in the channel, wherein the multiple data OFDM subcarriers of the first subchannel include a plurality of consecutive data OFDM subcarriers.

186. The first station of claim 182, further comprising a transmitter, wherein the receiver and the processor are further configured to:
   receive second control information from the second station, the second control information indicating a second set of transmission parameters to be used for receiving a second transmission; and
   receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the transmitter and the processor are configured to:
transmit a respective channel quality information for each subchannel of the plurality of subchannels.

187. The first station of claim 182, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein a first ratio of pilot OFDM subcarriers to data OFDM subcarriers of the first transmission is different than a second ratio of pilot OFDM subcarriers to data OFDM subcarriers of the second transmission and further wherein the first pilot pattern is based on the first channel conditions and the second pilot pattern is based on the second channel conditions.

188. The first station of claim 187, wherein the first ratio of pilot OFDM subcarriers and the second ratio of pilot OFDM subcarriers are based on minimizing pilot overhead.

189. The first station of claim 182, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the second MCS is the same value as the first MCS.

190. The first station of claim 182, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the second pilot pattern is applied at a user-based granularity, wherein the second pilot pattern spans multiple subchannels.

191. The first station of claim 182, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein OFDM subcarriers used for the first pilot pattern differ from OFDM subcarriers used for the second pilot pattern.

192. The first station of claim 182, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the plurality of subchannels includes a first and second data OFDM subcarrier and the second subchannel configuration configures the plurality of subchannels such that the first and second data OFDM subcarrier are separated by multiple OFDM subcarriers in the channel that are not used to send data in the plurality of subchannels.

193. The first station of claim 182, wherein the receiver and the processor are further configured to:
receive second control information from the second station, the second control information indicating a second set of transmission parameters to be used for receiving a second transmission; and
receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the channel includes a first OFDM subcarrier, the first OFDM subcarrier is used in the first subchannel to receive data in the first transmission using the first subchannel configuration; and the first OFDM subcarrier is not used in the first subchannel to receive data in the second transmission using the second subchannel configuration.

194. The first station of claim 182, wherein the receiver and the processor are further configured to:

receive second control information from the second station, the second control information indicating a second set of transmission parameters to be used for receiving a second transmission; and receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein OFDM subcarriers used for the first pilot pattern are the same as OFDM subcarriers used for the second pilot pattern and at least one OFDM subcarrier used for both the first and second pilot patterns has different amplitude and phase values as between the first and second pilot patterns.

195. The first station of claim 182, wherein the first channel conditions are detected at both the first station and the second station.

196. The first station of claim 182, further comprising a transmitter, wherein the transmitter and the processor are configured to:
transmit channel quality information to the second station prior to receiving the control information, wherein the channel quality information is determined based on a probing sequence transmission.

197. The first station of claim 182, further comprising a transmitter, wherein the transmitter and the processor are configured to:
transmit channel quality information to the second station prior to receiving the control information, wherein the channel quality information is explicitly transmitted from the first station to the second station and the channel quality information is a function of a signal level and a noise level.

198. The first station of claim 182, further comprising a transmitter, wherein the transmitter and the processor are configured to:
perform user-based power control that is determined based on user-specific power control information.

199. The first station of claim 182, wherein the first subchannel configuration is based on the first channel conditions and a user profile.

200. The first station of claim 182, wherein the first subchannel configuration determines an arrangement of the multiple data OFDM subcarriers of the first subchannel among OFDM subcarriers in the channel that are not used to send data in the first subchannel.

201. The first station of claim 200, wherein a plurality of subchannel configurations includes the first subchannel configuration and a second subchannel configuration, the first subchannel configuration characterized by the arrangement of the multiple data OFDM subcarriers of the first subchannel such that the multiple data OFDM subcarriers of the first subchannel are adjacent within the channel and the second subchannel configuration characterized by an arrangement of the multiple data OFDM subcarriers of the first subchannel such that the multiple data OFDM subcarriers of the first subchannel are not adjacent within the channel.

202. The first station of claim 182, wherein the plurality of OFDM subcarriers of the channel comprise at least one silent OFDM subcarrier and the OFDM subcarriers in the channel that are not used to send data in the first subchannel include the at least one silent OFDM subcarrier.

203. The first station of claim 202, wherein the first subchannel configuration configures the multiple data OFDM subcarriers of the first subchannel such that a first and second data OFDM subcarrier within the first subchannel are separated by a single silent OFDM subcarrier within the channel.

204. A first station served by a second station that uses one or more subchannels within a channel, the channel comprising a plurality of orthogonal frequency division duplex (OFDM) subcarriers and each subchannel of the one or more subchannels using multiple data OFDM subcarriers from the plurality of OFDM subcarriers of the channel, the first station comprising:
a receiver; and
a processor;
wherein the receiver and the processor are configured to:
receive control information from the second station, the control information indicating a first set of transmission parameters to be used for receiving a first transmission; and
receive the first transmission, the first transmission having a first subchannel, a first modulation and coding scheme (MCS) of a plurality of MCSs, a first pilot pattern of a plurality of pilot patterns, and a first subchannel configuration of a plurality of subchannel configurations;
wherein the first subchannel configuration, the first MCS, and the first pilot pattern are determined based on the first set of transmission parameters, wherein the first set of transmission parameters are based at least in part on first channel conditions, and wherein the first subchannel configuration determines an arrangement of the multiple data OFDM subcarriers of the first subchannel among OFDM subcarriers in the channel that are not used to send data in the first subchannel.

205. The first station of claim 204, wherein at least two of: the first subchannel configuration, the first MCS, and the first pilot pattern are determined from a single received transmission parameter.

206. The first station of claim 204, wherein a single index value within the first set of transmission parameters indicates a modulation and a code rate of the first MCS.

207. The first station of claim 204, wherein the first subchannel is from at least two subchannels in the channel, wherein the multiple data OFDM subcarriers of the first subchannel include a plurality of consecutive data OFDM subcarriers.

208. The first station of claim 204, further comprising a transmitter, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
wherein the transmitter and the processor are configured to:
transmit a respective channel quality information for each subchannel of the plurality of subchannels.

209. The first station of claim 204, wherein the receiver and the processor are further configured to:
- receive second control information from the second station, the second control information indicating a second set of transmission parameters to be used for receiving a second transmission; and
- receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
- wherein a first ratio of pilot OFDM subcarriers to data OFDM subcarriers of the first transmission is different than a second ratio of pilot OFDM subcarriers to data OFDM subcarriers of the second transmission and further wherein the first pilot pattern is based on the first channel conditions and the second pilot pattern is based on the second channel conditions.

210. The first station of claim 209, wherein the first ratio of pilot OFDM subcarriers and the second ratio of pilot OFDM subcarriers are based on minimizing pilot overhead.

211. The first station of claim 204, wherein the receiver and the processor are further configured to:
- receive second control information from the second station, the second control information indicating a second set of transmission parameters to be used for receiving a second transmission; and
- receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
- wherein the second MCS is the same value as the first MCS.

212. The first station of claim 204, wherein the receiver and the processor are further configured to:
- receive second control information from the second station, the second control information indicating a second set of transmission parameters to be used for receiving a second transmission; and
- receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
- wherein the second pilot pattern is applied at a user-based granularity, wherein the second pilot pattern spans multiple subchannels.

213. The first station of claim 204, wherein the receiver and the processor are further configured to:
- receive second control information from the second station, the second control information indicating a second set of transmission parameters to be used for receiving a second transmission; and
- receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
- wherein OFDM subcarriers used for the first pilot pattern differ from OFDM subcarriers used for the second pilot pattern.

214. The first station of claim 204, wherein the receiver and the processor are further configured to:
- receive second control information from the second station, the second control information indicating a second set of transmission parameters to be used for receiving a second transmission; and
- receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
- wherein the plurality of subchannels includes a first and second data OFDM subcarrier and the second subchannel configuration configures the plurality of subchannels such that the first and second data OFDM subcarrier are separated by multiple OFDM subcarriers in the channel that are not used to send data in the plurality of subchannels.

215. The first station of claim 204, wherein the receiver and the processor are further configured to:
- receive second control information from the second station, the second control information indicating a second set of transmission parameters to be used for receiving a second transmission; and
- receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and
- wherein the channel includes a first OFDM subcarrier, the first OFDM subcarrier is used in the first subchannel to receive data in the first transmission using the first subchannel configuration; and the first OFDM subcarrier is not used in the first subchannel to receive data in the second transmission using the second subchannel configuration.

216. The first station of claim 204, wherein the receiver and the processor are further configured to:
- receive second control information from the second station, the second control information indicating a second set of transmission parameters to be used for receiving a second transmission; and
- receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein OFDM subcarriers used for the first pilot pattern are the same as OFDM subcarriers used for the second pilot pattern and at least one OFDM subcarrier used for both the first and second pilot patterns has different amplitude and phase values as between the first and second pilot patterns.

217. The first station of claim 204, wherein the first channel conditions are detected at both the first station and the second station.

218. The first station of claim 204, further comprising a transmitter, wherein the transmitter and the processor are configured to:
transmit channel quality information to the second station prior to receiving the control information, wherein the channel quality information is determined based on a probing sequence transmission.

219. The first station of claim 204, further comprising a transmitter, wherein the transmitter and the processor are configured to:
transmit channel quality information to the second station prior to receiving the control information, wherein the channel quality information is explicitly transmitted from the first station to the second station and the channel quality information is a function of a signal level and a noise level.

220. The first station of claim 204, further comprising a transmitter, wherein the transmitter and the processor are configured to:
perform user-based power control that is determined based on user-specific power control information.

221. The first station of claim 204, wherein the first subchannel configuration is based on the first channel conditions and a user profile.

222. The first station of claim 204, wherein a plurality of subchannel configurations includes the first subchannel configuration and a second subchannel configuration, the first subchannel configuration characterized by the arrangement of the multiple data OFDM subcarriers of the first subchannel such that the multiple data OFDM subcarriers of the first subchannel are adjacent within the channel and the second subchannel configuration characterized by an arrangement of the multiple data OFDM subcarriers of the first subchannel such that the multiple data OFDM subcarriers of the first subchannel are not adjacent within the channel.

223. The first station of claim 204, wherein the plurality of OFDM subcarriers of the channel comprise at least one silent OFDM subcarrier and the OFDM subcarriers in the channel that are not used to send data in the first subchannel include the at least one silent OFDM subcarrier.

224. The first station of claim 223, wherein the first subchannel configuration configures the multiple data OFDM subcarriers of the first subchannel such that a first and second data OFDM subcarrier within the first subchannel are separated by a single silent OFDM subcarrier within the channel.

225. A first station served by a second station that uses one or more subchannels within a channel, the channel comprising a plurality of orthogonal frequency division duplex (OFDM) subcarriers and each subchannel of the one or more subchannels using multiple data OFDM subcarriers from the plurality of OFDM subcarriers of the channel, the first station comprising:
a receiver; and
a processor;

wherein the receiver and the processor are configured to:
receive control information from the second station, the control information indicating a first set of transmission parameters to be used for receiving a first transmission; and
receive the first transmission, the first transmission having a first subchannel, a first modulation and coding scheme (MCS) of a plurality of MCSs, a first pilot pattern of a plurality of pilot patterns, and a first subchannel configuration of a plurality of subchannel configurations;

wherein the first subchannel configuration, the first MCS, and the first pilot pattern are determined based on the first set of transmission parameters, wherein the first set of transmission parameters are based at least in part on first channel conditions, and wherein the plurality of OFDM subcarriers of the channel comprise at least one silent OFDM subcarrier and the OFDM subcarriers in the channel that are not used to send data in the first subchannel include the at least one silent OFDM subcarrier.

226. The first station of claim 225, wherein at least two of: the first subchannel configuration, the first MCS, and the first pilot pattern are determined from a single received transmission parameter.

227. The first station of claim 225, wherein a single index value within the first set of transmission parameters indicates a modulation and a code rate of the first MCS.

228. The first station of claim 225, wherein the first subchannel is from at least two subchannels in the channel, wherein the multiple data OFDM subcarriers of the first subchannel include a plurality of consecutive data OFDM subcarriers.

229. The first station of claim 225, further comprising a transmitter, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the transmitter and the processor are configured to:
transmit a respective channel quality information for each subchannel of the plurality of subchannels.

230. The first station of claim 225, wherein the receiver and the processor are further configured to:
receive second control information from the second station, the second control information indicating a second set of transmission parameters to be used for receiving a second transmission; and
receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein a first ratio of pilot OFDM subcarriers to data OFDM subcarriers of the first transmission is different than a second ratio of pilot OFDM subcarriers to data OFDM subcarriers of the second transmission and further wherein the first pilot pattern is based on the first channel conditions and the second pilot pattern is based on the second channel conditions.

231. The first station of claim 230, wherein the first ratio of pilot OFDM subcarriers and the second ratio of pilot OFDM subcarriers are based on minimizing pilot overhead.

232. The first station of claim 225, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the second MCS is the same value as the first MCS.

233. The first station of claim 225, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the second pilot pattern is applied at a user-based granularity, wherein the second pilot pattern spans multiple subchannels.

234. The first station of claim 225, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein OFDM subcarriers used for the first pilot pattern differ from OFDM subcarriers used for the second pilot pattern.

235. The first station of claim 225, wherein the receiver and the processor are further configured to:

receive second control information from the second station, the second control information indicating a second set of transmission parameters to be used for receiving a second transmission; and receive the second transmission, the second transmission having a plurality of subchannels, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the plurality of subchannels includes a first and second data OFDM subcarrier and the second subchannel configuration configures the plurality of subchannels such that the first and second data OFDM subcarrier are separated by multiple OFDM subcarriers in the channel that are not used to send data in the plurality of subchannels.

236. The first station of claim 225, wherein the receiver and the processor are further configured to:

receive second control information from the second station, the second control information indicating a second set of transmission parameters to be used for receiving a second transmission; and receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein the channel includes a first OFDM subcarrier, the first OFDM subcarrier is used in the first subchannel to receive data in the first transmission using the first subchannel configuration; and the first OFDM subcarrier is not used in the first subchannel to receive data in the second transmission using the second subchannel configuration.

237. The first station of claim 225, wherein the receiver and the processor are further configured to:

receive second control information from the second station, the second control information indicating a second set of transmission parameters to be used for receiving a second transmission; and receive the second transmission, the second transmission having at least the first subchannel, a second subchannel configuration, a second MCS, and a second pilot pattern, wherein the second subchannel configuration, the second MCS, and the second pilot pattern are determined based on the second set of transmission parameters, and wherein the second set of transmission parameters are based at least in part on second channel conditions; and wherein OFDM subcarriers used for the first pilot pattern are the same as OFDM subcarriers used for the second pilot pattern and at least one OFDM subcarrier used for both the first and second pilot patterns has different amplitude and phase values as between the first and second pilot patterns.

238. The first station of claim 225, wherein the first channel conditions are detected at both the first station and the second station.

239. The first station of claim 225, further comprising a transmitter, wherein the transmitter and the processor are configured to:
transmit channel quality information to the second station prior to receiving the control information, wherein the channel quality information is determined based on a probing sequence transmission.

240. The first station of claim 225, further comprising a transmitter, wherein the transmitter and the processor are configured to:
transmit channel quality information to the second station prior to receiving the control information, wherein the channel quality information is explicitly transmitted from the first station to the second station and the channel quality information is a function of a signal level and a noise level.

241. The first station of claim 225, further comprising a transmitter, wherein the transmitter and the processor are configured to:
perform user-based power control that is determined based on user-specific power control information.

242. The first station of claim 225, wherein the first subchannel configuration is based on the first channel conditions and a user profile.

243. The first station of claim 225, wherein the first subchannel configuration determines an arrangement of the multiple data OFDM subcarriers of the first subchannel among OFDM subcarriers in the channel that are not used to send data in the first subchannel, and wherein a plurality of subchannel configurations includes the first subchannel configuration and a second subchannel configuration, the first subchannel configuration characterized by the arrangement of the multiple data OFDM subcarriers of the first subchannel such that the multiple data OFDM subcarriers of the first subchannel are adjacent within the channel and the second subchannel configuration characterized by an arrangement of the multiple data OFDM subcarriers of the first subchannel such that the multiple data OFDM subcarriers of the first subchannel are not adjacent within the channel.

244. The first station of claim 225, wherein the first subchannel configuration configures the multiple data OFDM subcarriers of the first subchannel such that a first and second data OFDM subcarrier within the first subchannel are separated by a single silent OFDM subcarrier within the channel.

* * * * *